Sept. 29, 1953   A. B. MACHADO ET AL   2,653,765
DIVIDEND ALIGNING MECHANISM
Filed Dec. 22, 1948   13 Sheets-Sheet 1
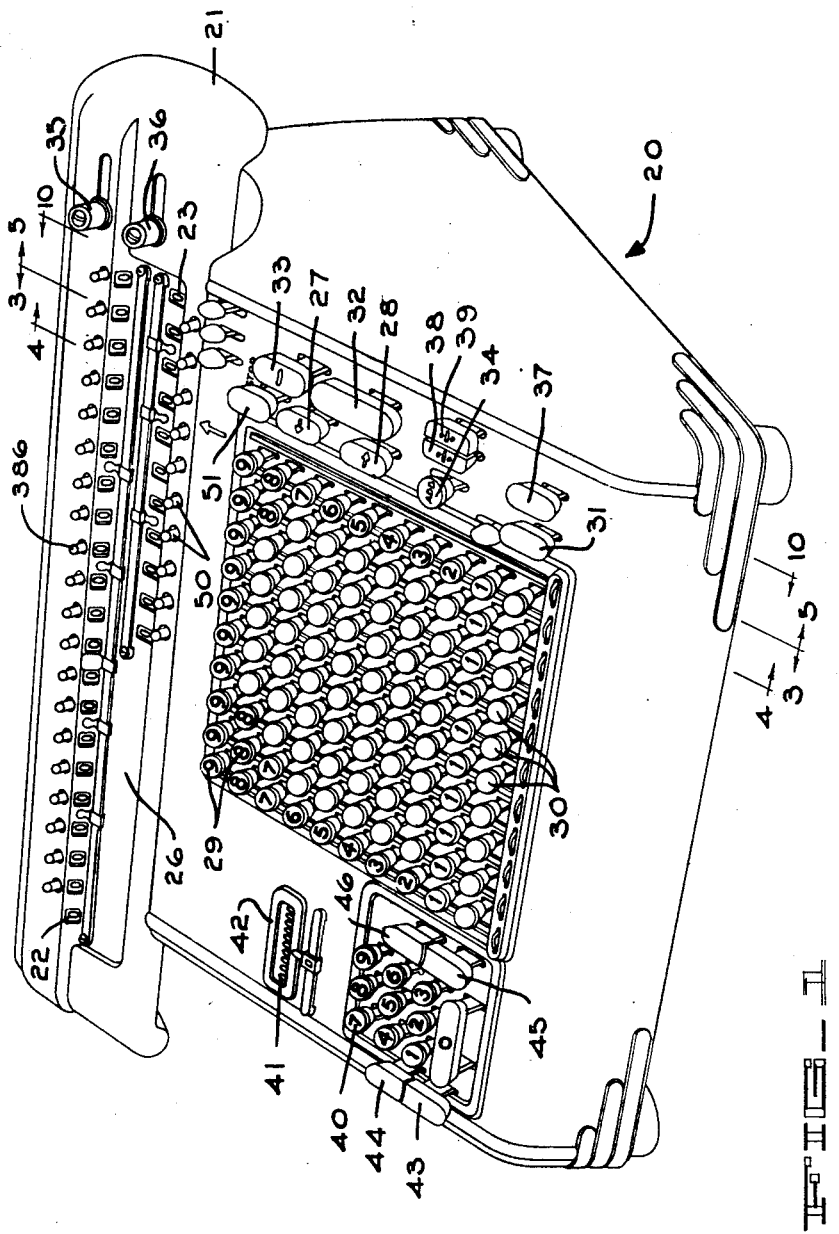
INVENTORS
ANTHONY B. MACHADO
FRANK J. PRUELLAGE
BY

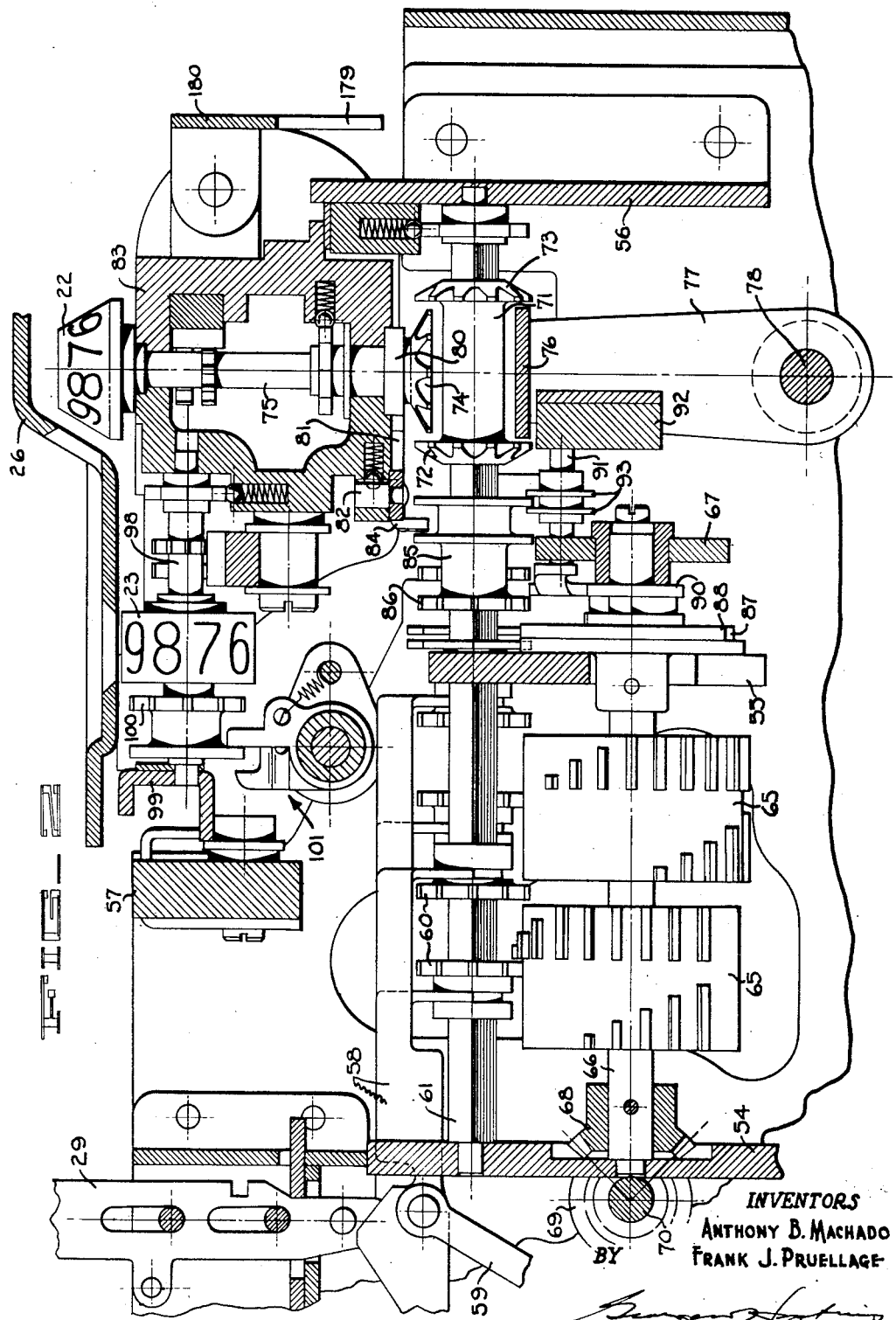

Sept. 29, 1953    A. B. MACHADO ET AL    2,653,765
DIVIDEND ALIGNING MECHANISM
Filed Dec. 22, 1948            13 Sheets-Sheet 3
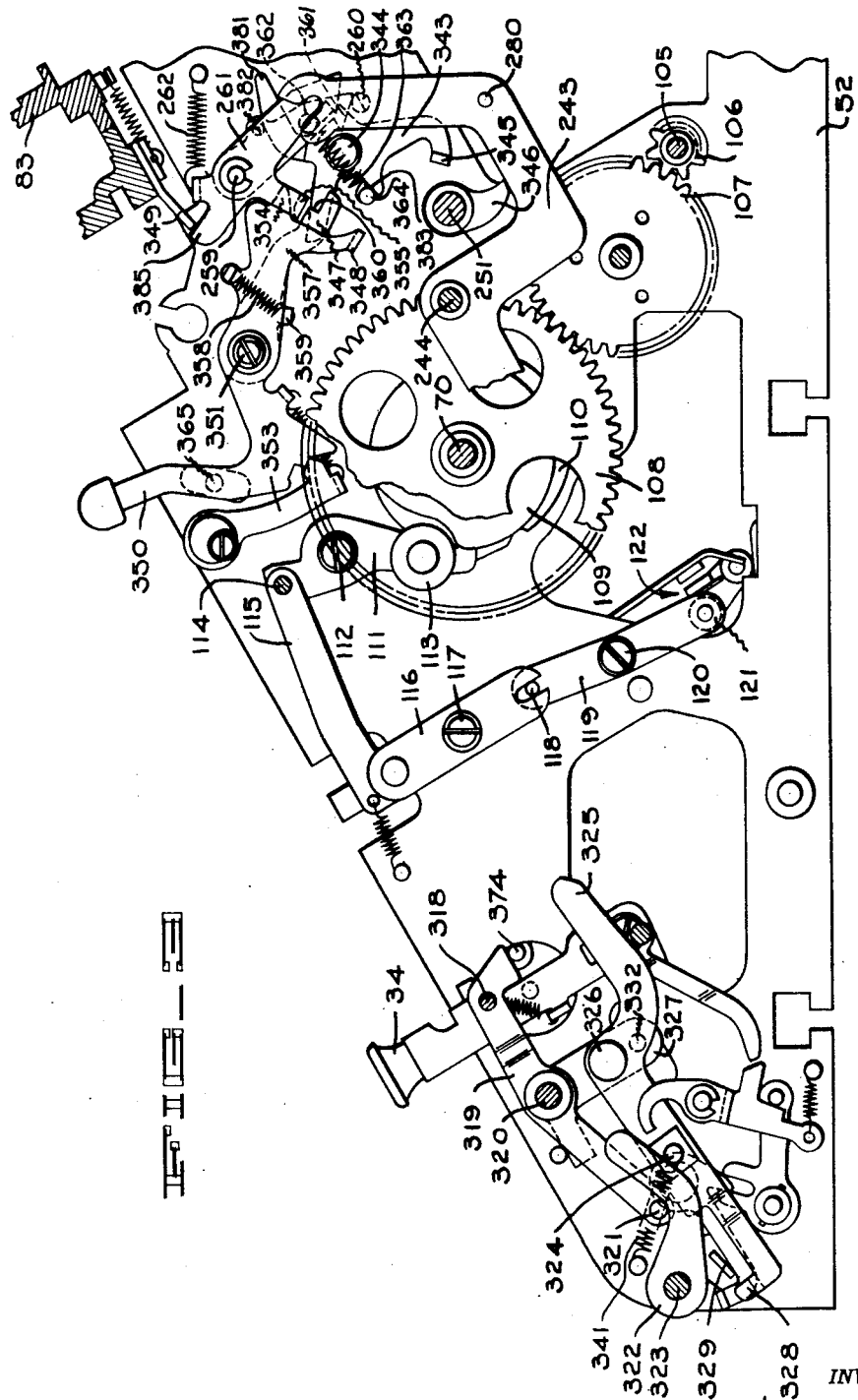
INVENTORS
ANTHONY B. MACHADO
FRANK J. PRUELLAGE
BY

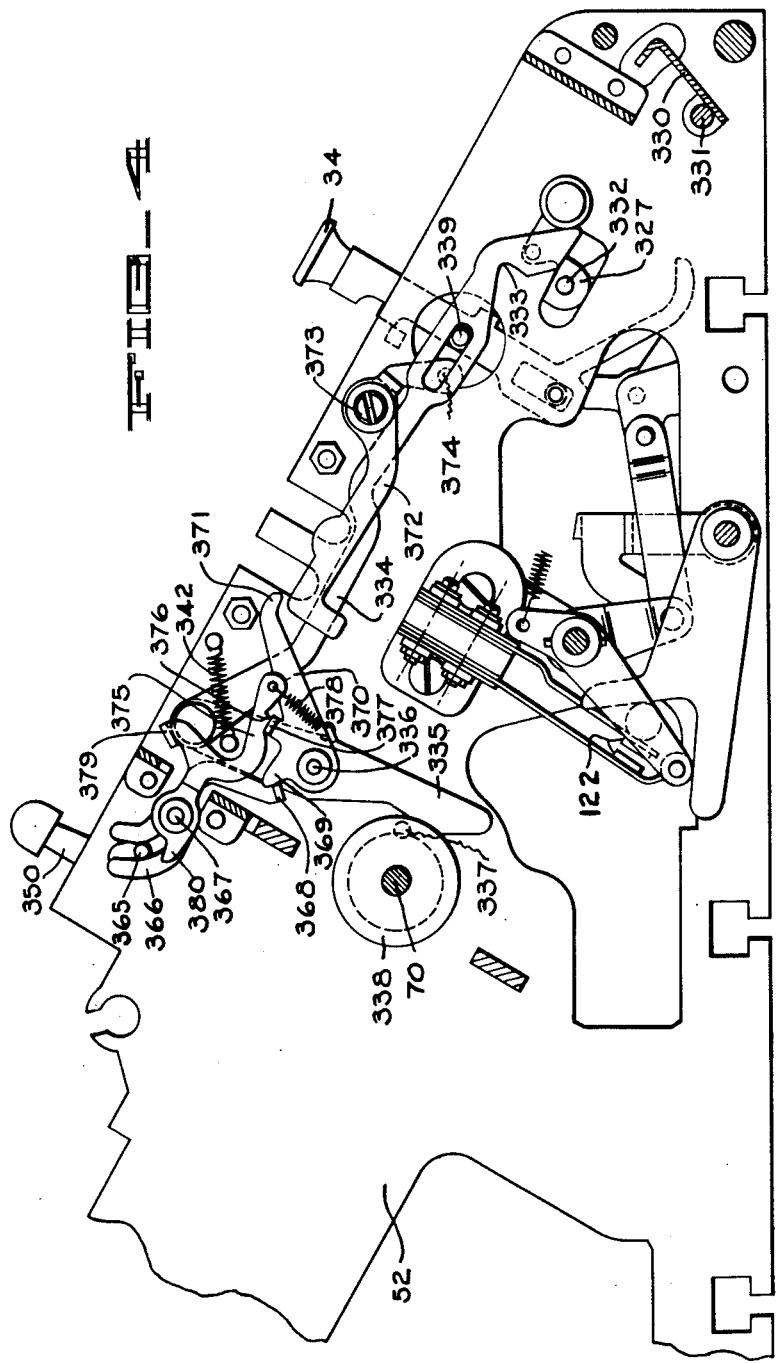

Sept. 29, 1953  A. B. MACHADO ET AL  2,653,765
DIVIDEND ALIGNING MECHANISM
Filed Dec. 22, 1948  13 Sheets-Sheet 5
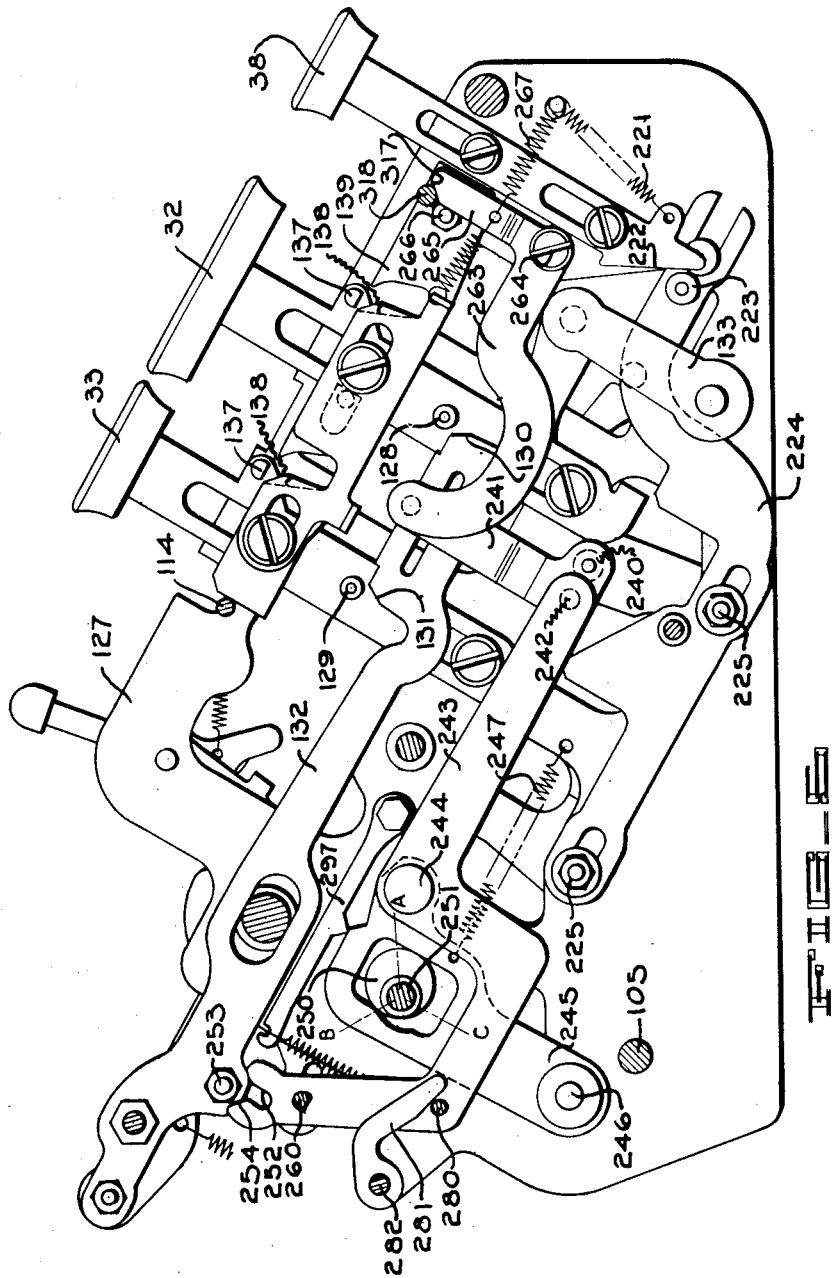
INVENTORS
ANTHONY B. MACHADO
BY  FRANK J. PRUELLAGE Sept. 29, 1953     A. B. MACHADO ET AL     2,653,765
DIVIDEND ALIGNING MECHANISM
Filed Dec. 22, 1948     13 Sheets-Sheet 6
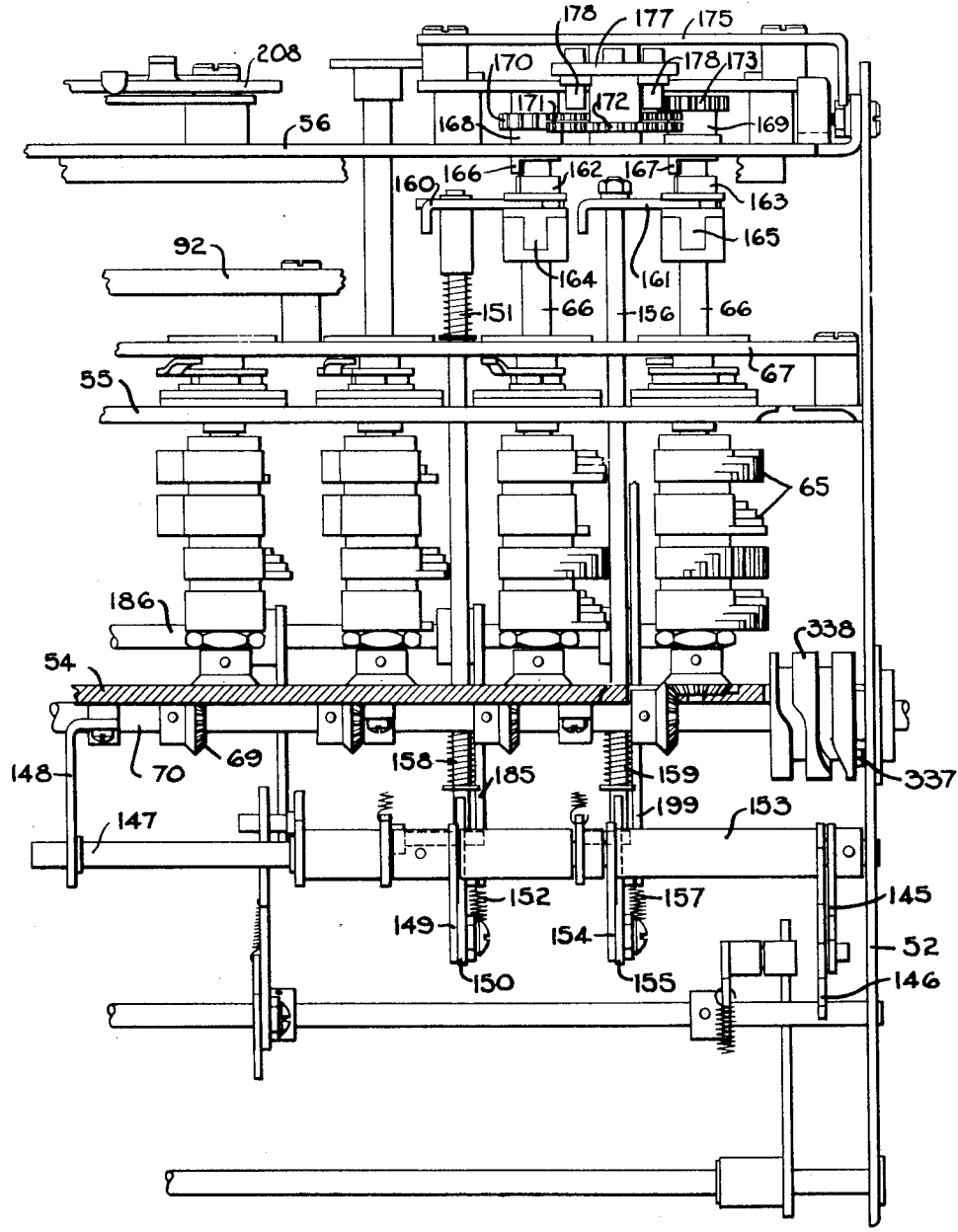
FIG_6
INVENTORS
ANTHONY B. MACHADO
FRANK J. PRUELLAGE
BY

Sept. 29, 1953     A. B. MACHADO ET AL     2,653,765
DIVIDEND ALIGNING MECHANISM
Filed Dec. 22, 1948     13 Sheets-Sheet 7
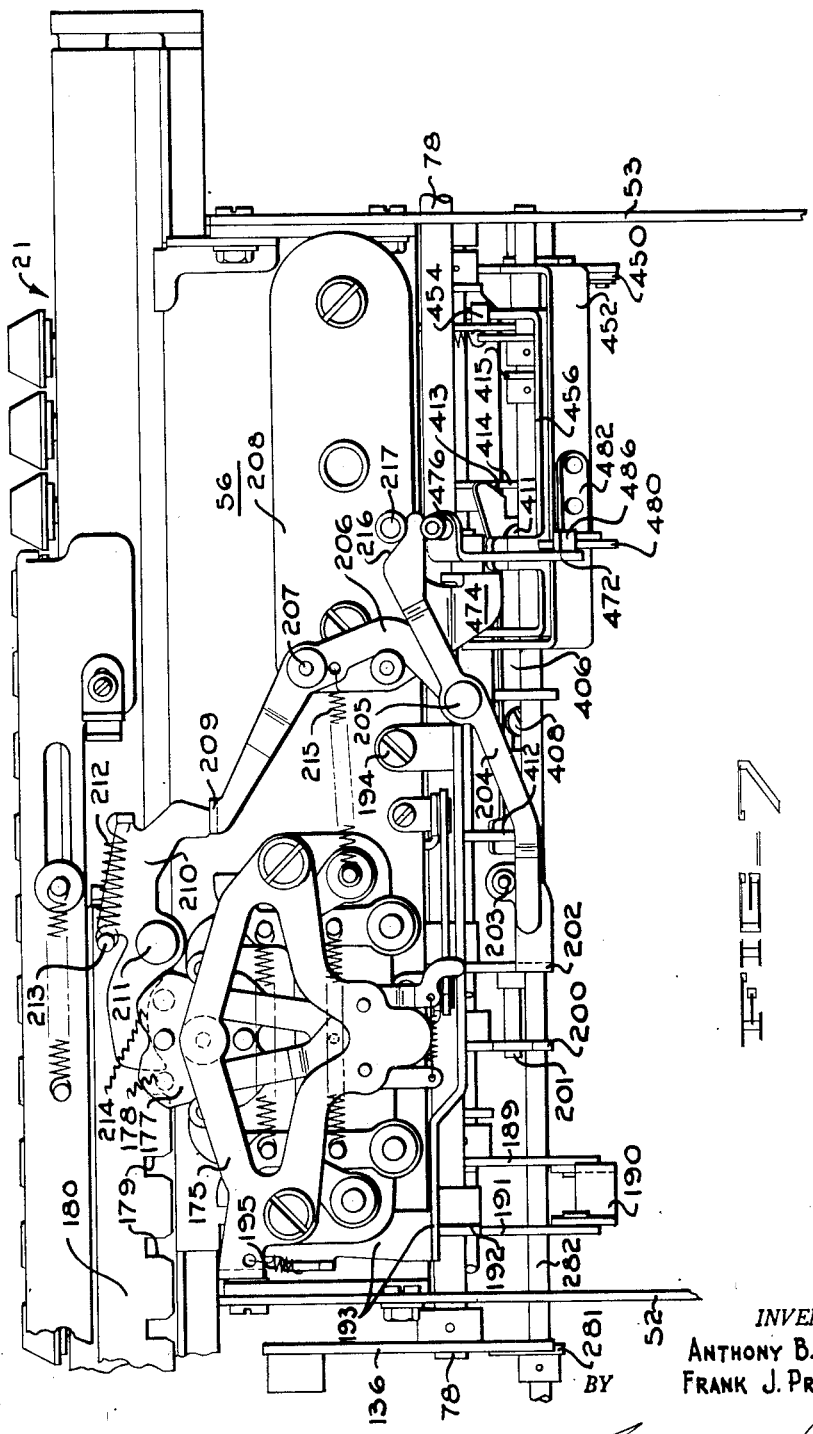
INVENTORS
ANTHONY B. MACHADO
FRANK J. PRUELLAGE
BY

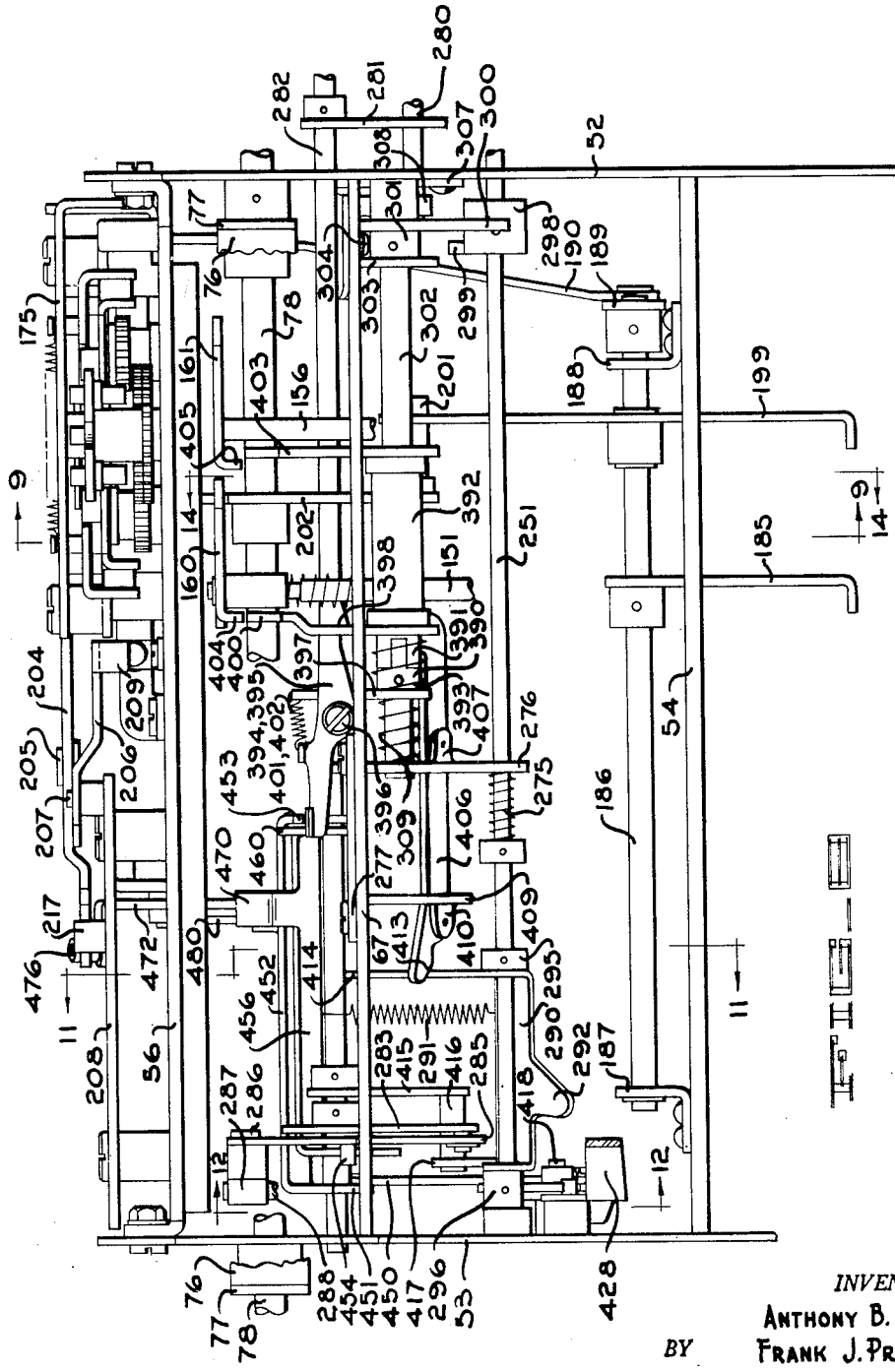

Sept. 29, 1953     A. B. MACHADO ET AL     2,653,765
DIVIDEND ALIGNING MECHANISM
Filed Dec. 22, 1948                               13 Sheets-Sheet 9
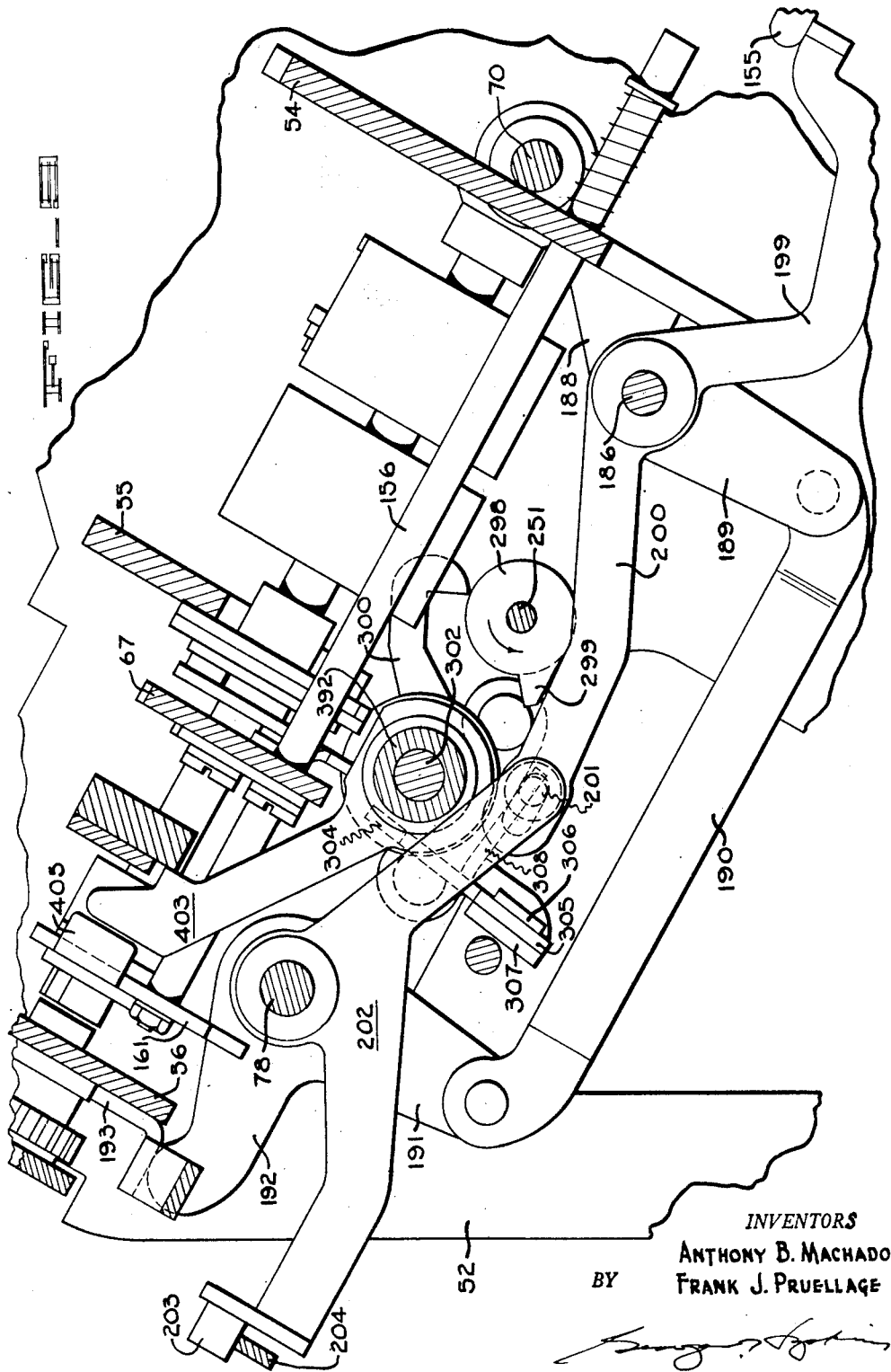
INVENTORS
ANTHONY B. MACHADO
BY FRANK J. PRUELLAGE Sept. 29, 1953  A. B. MACHADO ET AL  2,653,765
DIVIDEND ALIGNING MECHANISM
Filed Dec. 22, 1948  13 Sheets—Sheet 10
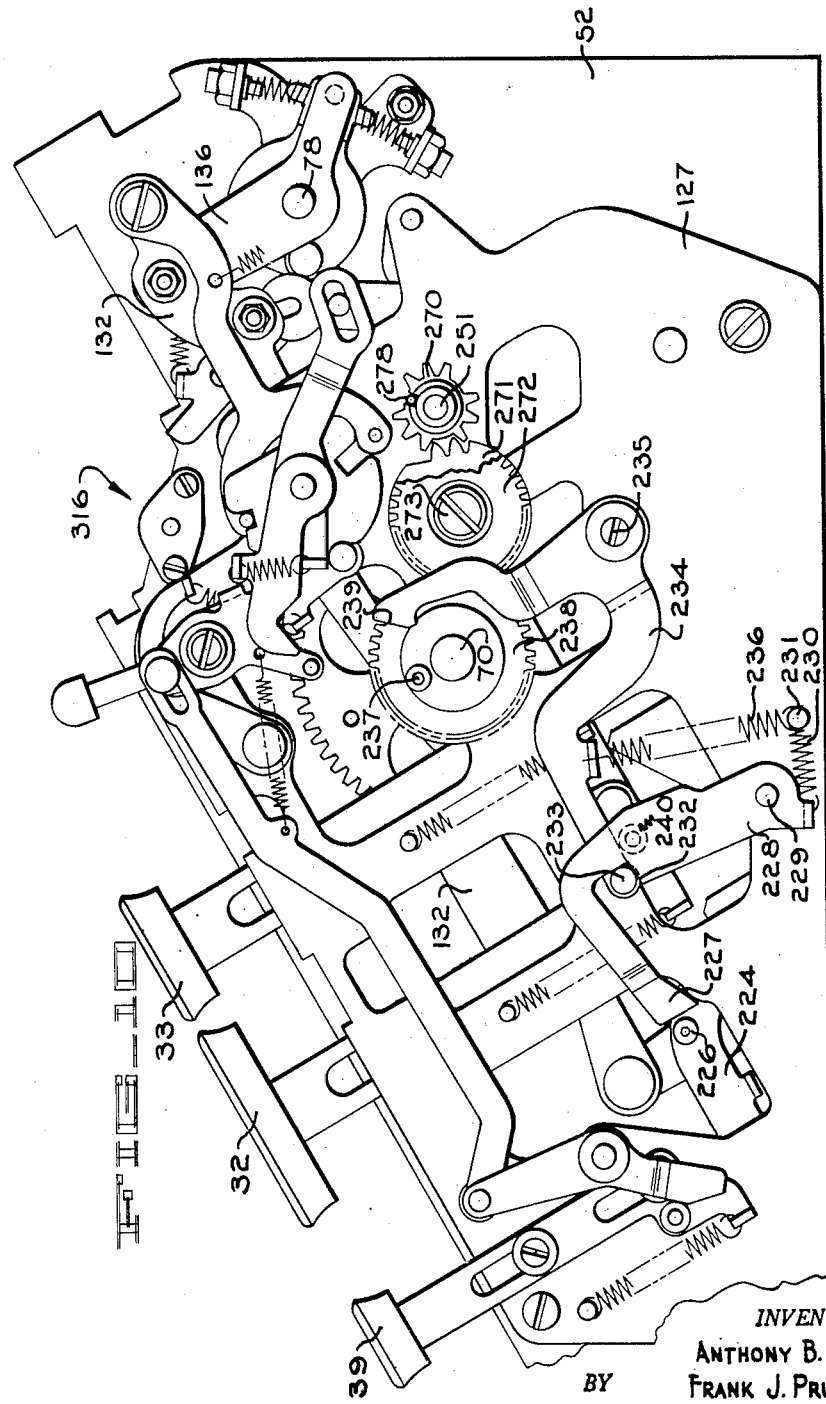
INVENTORS
ANTHONY B. MACHADO
FRANK J. PRUELLAGE
BY

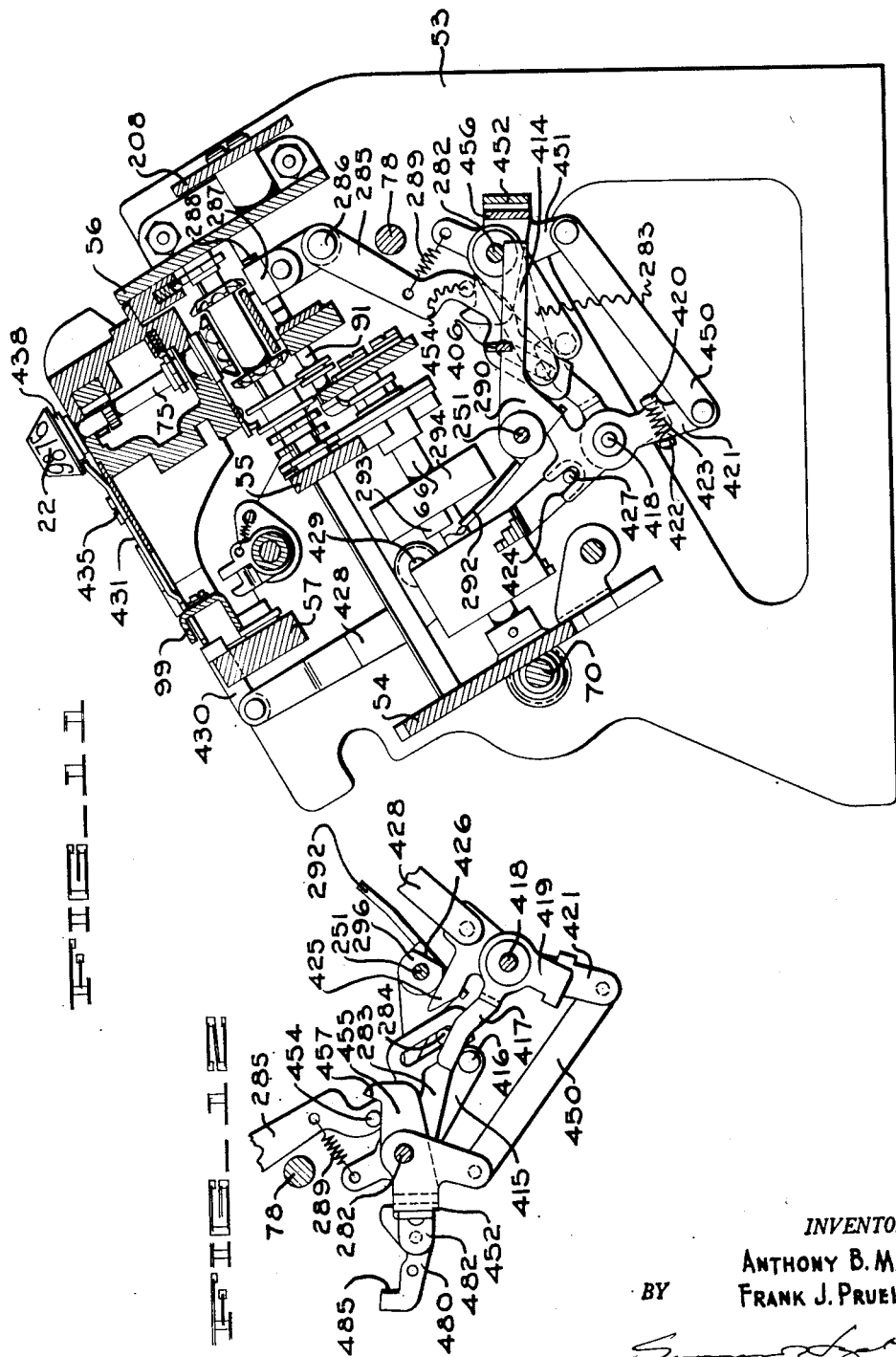

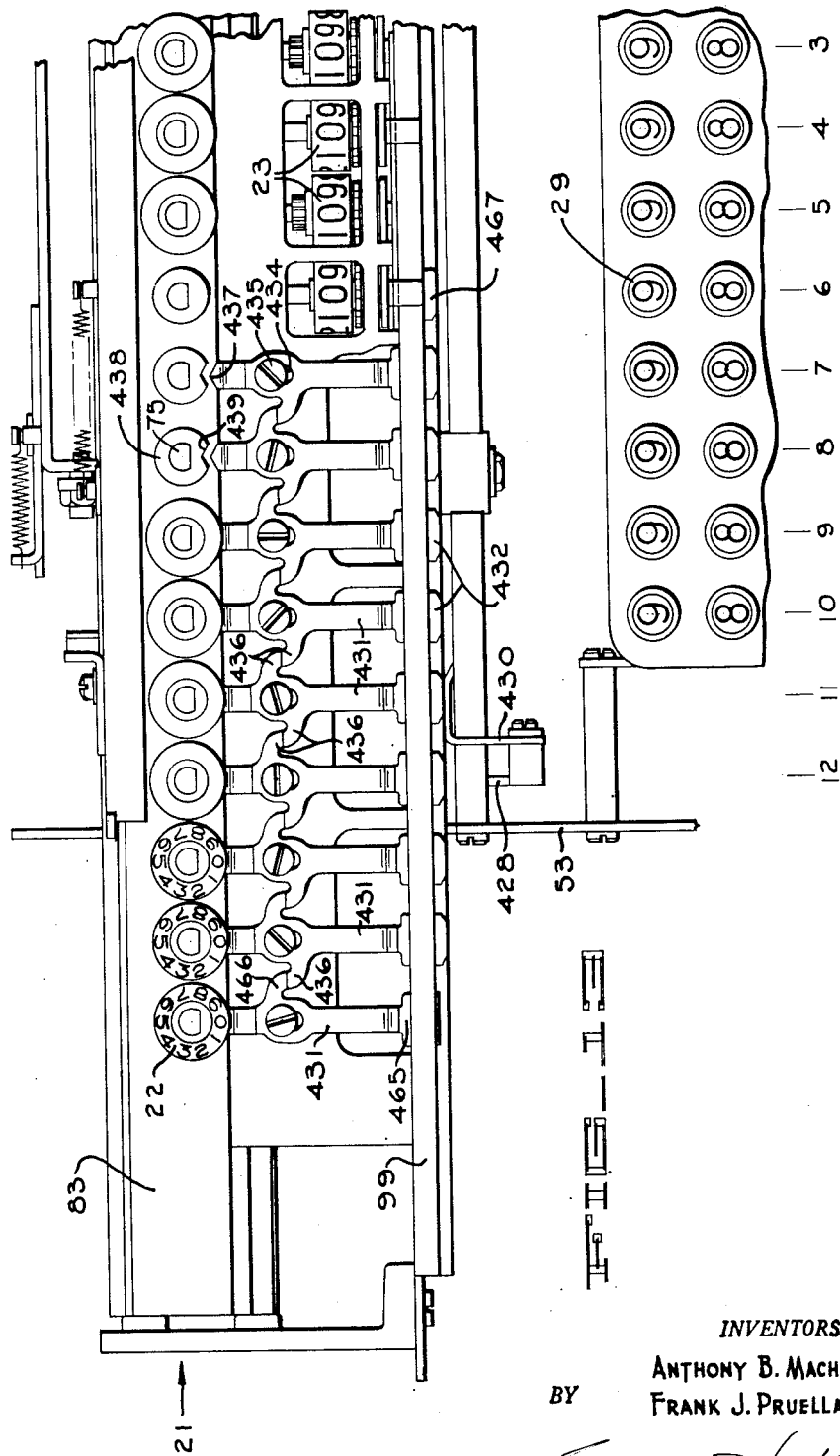

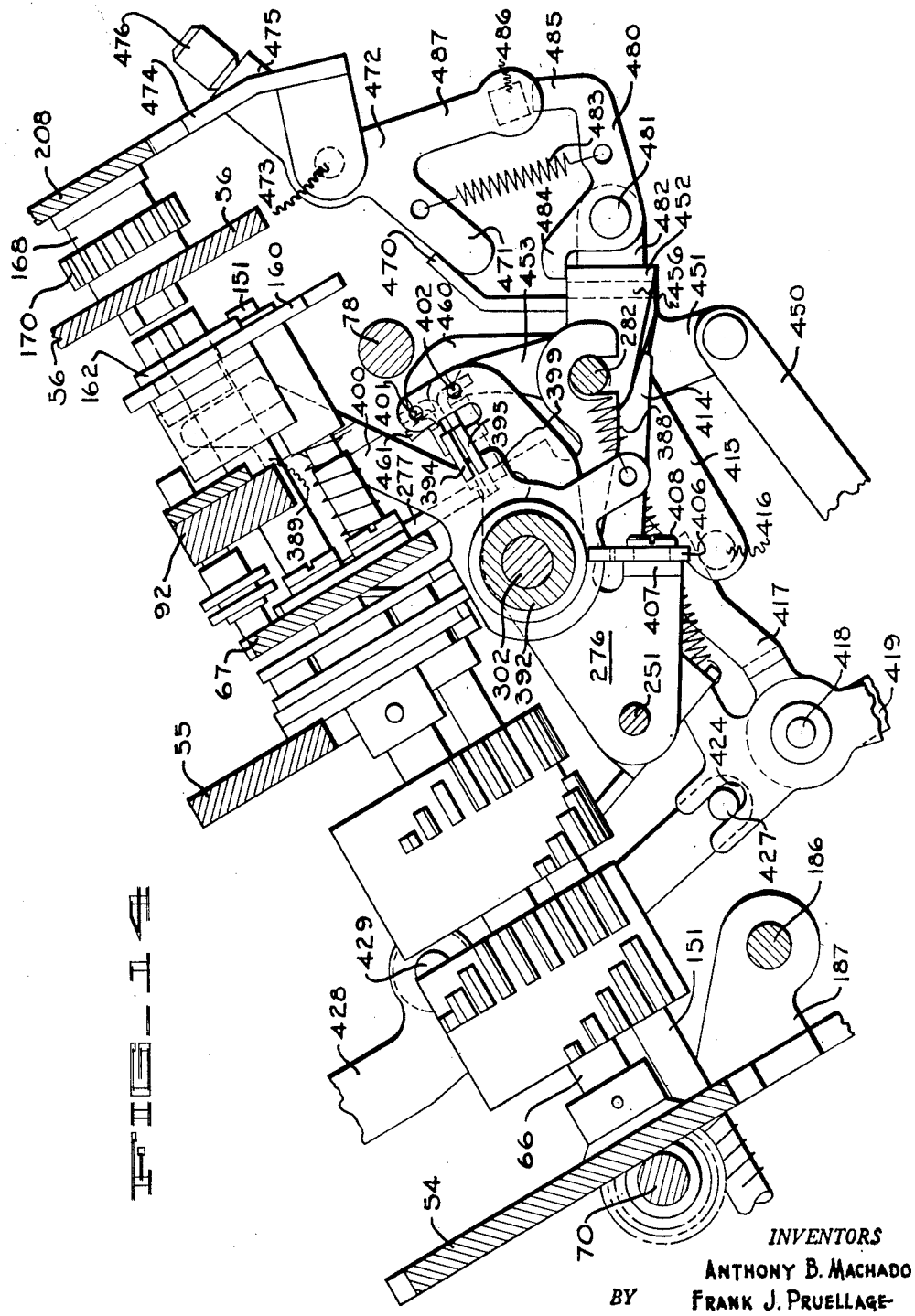

Patented Sept. 29, 1953

2,653,765

UNITED STATES PATENT OFFICE 2,653,765

DIVIDEND ALIGNING MECHANISM

Anthony B. Machado, San Leandro, and Frank J. Pruellage, Oakland, Calif., assignors to Friden Calculating Machine Co., Inc., a corporation of California Application December 22, 1948, Serial No. 66,688

27 Claims. (Cl. 235—63)

This invention relates to an improved automatic division mechanism for calculating machines and more particularly to a device for causing the factors of a division problem to be automatically aligned with one another prior to the commencement of the actual dividing operation.

Many of the calculating machines on the market today are provided with a mechanism which serves to control the functioning of the machine in division problems in such a manner as to cause the dividend to be automatically divided by the divisor, the quotient being displayed on a set of figure dials at the conclusion of the operation. With these machines, however, it is first necessary for the operator to check the ordinal setting of the divisor and dividend before division is started in order to insure that the highest digits of the factors are in proper alignment with one another. If they are not in their correct positions, he must then manually control the shift mechanism so as to cause the factors to be brought into correct alignment after which the division key is depressed so as to initiate the division operation.

The present invention has to do with a mechanism for causing the dividend and divisor to be brought into proper alignment prior to the outset of the division operation thereby relieving the operator of the necessity of insuring that the alignment is correct before initiating the division operation. In accordance with this invention, the factors are set into the machine in the customary manner after which the division key is depressed. The novel mechanism hereinafter to be described, is thereby set into operation so as to cause the factors, if misaligned, to be brought into proper alignment after which the conventional automatic division mechanism will take over control and cause the machine to proceed with the division operation.

Accordingly, it is an object of the present invention to provide means for increasing the ease and rapidity with which division operations may be performed. This is accomplished by providing mechanism for automatically lining up the dividend and divisor at the outset of the operation whereby the time and effort spent by the operator in manually performing this step of the operation is eliminated.

Another object of the invention is to provide means for automatically aligning the dividend and divisor and then dividing the dividend by the divisor in one continuous operation.

A further object of the invention is to provide means for shifting the dividend relative to the divisor in one direction until the factors are brought into proper alignment after which the direction of shift is reversed and an automatic division operation is performed in the customary manner.

Still a further object of the invention is to provide a calculating machine having a shift reversing mechanism for the accumulator carriage which is controlled by the tens-transfer mechanism of the accumulator and also by the numerical setting of the accumulator wheels.

An additional object of the invention is to provide a calculating machine having means for shifting the accumulator carriage in one direction until the dividend is brought into alignment with the divisor or until the carriage reaches its end position after which the shift is automatically reversed so as to cause a normal dividing operation to take place.

The present invention is concerned with these and other objects which will become apparent from the following description of a preferred embodiment of the invention as shown in the accompanying drawings in which:

Fig. 1 is a perspective view of the complete machine.

Fig. 2 is a longitudinal sectional elevation illustrating the detailed construction of the accumulator carriage and of the selecting and actuating mechanism of the machine.

Fig. 3 is a view showing the mechanism mounted on the right-hand side of the right side frame, this view being taken along the line 3—3 in Fig. 1.

Fig. 4 is a view similar to Fig. 3 but showing the mechanism mounted on the left-hand side of the right-side frame, this view being taken along the line 4—4 in Fig. 1.

Fig. 5 is a side elevation taken along the line 5—5 in Fig. 1 showing the mechanism mounted on the left-hand side of the control plate.

Fig. 6 is a plan view of the right-hand portion of the machine showing a part of the carriage shift mechanism.

Fig. 7 is a rear view of the machine showing a portion of the division aligner mechanism and also certain parts of the carriage shift mechanism.

Fig. 8 is a plan view of the rear portion of the machine showing certain parts of the division aligner mechanism.

Fig. 9 is a longitudinal sectional elevation taken along the line 9—9 in Fig. 8 and showing a portion of the mechanism for terminating the carriage shifting operation when the carriage reaches its right-hand position.

Fig. 10 is a side elevation taken along the line 10—10 in Fig. 1 showing the mechanism mounted on the right-hand side of the control plate.

Fig. 11 is a cross-sectional view taken along the line 11—11 in Fig. 8 showing the control of the division aligner mechanism from the accumulator wheels on the carriage.

Fig. 12 is a fragmentary view of a portion of the division aligner mechanism as viewed from the left-hand side of the machine.

Fig. 13 is a plan view showing the mechanism for sensing the numerical setting of the accumulator wheels.

Fig. 14 is a cross-sectional view taken along the line 14—14 in Fig. 8 showing the mechanism for reversing the direction of the carriage shift when the carriage reaches its right-end position.

*General description*

The present invention is an improvement on a calculating machine of the type disclosed in U. S. Patent No. 2,327,981, issued to Carl M. F. Friden on August 31, 1943, which relates to an improved automatic division mechanism for the calculating machine shown and described in U. S. Patent No. 2,229,889, issued to Carl M. F. Friden on January 28, 1941.

Referring to Fig. 1, the calculating machine incorporating the present invention includes a main body portion 20 containing the actuating, selecting and control mechanisms of the machine and an accumulator and revolutions counter carriage 21 which is mounted for endwise shifting movement transversely of the body portion 20. The carriage 21 has mounted therein a series of accumulator dials 22 and also a group of revolutions counter dials 23 which are viewable through suitable openings provided in the cover 26 of the carriage. The carriage may be shifted by power in either direction across the machine by manipulation of a left shift key 27 and a right shift key 28 located on the right-hand side of the machine.

Numerical values may be entered in the machine by depression of appropriate numeral keys 29 of a conventional amount keyboard, the keys in each row being releasable individually by depression of an ordinal clear key 30 situated at the forward end of each bank of keys, or the simultaneous release of all of the keys may be accomplished by depression of a clear key 31. The various values set up on the keyboard may be registered additively or subtractively on the accumulator wheels 22 by the depression of a plus key 32 or a minus key 33, respectively. If it is desired that the keyboard be cleared after each registration of a number in the accumulator, an add key 34 may be depressed and latched down in the well-known manner.

The accumulator wheels 22 and the revolutions counter wheels 23 may be cleared or reset to zero by manipulation of manually operable reset knobs 35 and 36 respectively, these knobs being mounted for lateral sliding movement in the framework of the carriage. Alternatively, the wheels 22 and 23 may be zeroized by power through the depression of a return clear key 37.

The machine is adapted to perform automatic division operations by manipulation of a pair of division keys 38 and 39 which control a division mechanism similar to the type described in U. S. Patent No. 2,327,981 mentioned above. Automatic multiplication operations may be performed by depression of appropriate multiplier selection keys 40 in order to set-up the desired multiplier factor on multiplier dials 41 viewable through a window 42 provided in the front cover of the machine. The multiplication operation is adapted to be initiated by one of the multiplication control keys 43, 44, or 45 which will cause the carriage 21 to be shifted to its extreme left-hand position after which the multiplicand set-up on the amount keys 29 will be multiplied digit by digit by the multiplier set up on the dials 41. If it should become necessary to clear the multiplier factor from the machine, a multiplier correction key 46 may be depressed which will initiate a machine operation in which the multiplier set-up mechanism will be normalized.

The machine is also provided with a group of ordinally arranged tabulator keys 50 and a dividend entry key 51 for effecting the entry of a dividend set up on the amount keys 29 into the accumulator wheels 22 in any selected ordinal position of the carriage. This mechanism is fully shown and described in U. S. Patent No. 2,403,273, issued to Carl M. Friden et al. on July 2, 1946, and reference is made to this patent for a detailed explanation of the dividend entry mechanism.

*Selecting and actuating mechanism*

The main operating mechanisms of the machine are supported for the most part on or between a right side frame 52 (Figs. 3, 4, 7 and 8) and a left side frame 53 (Figs. 7 and 8) which frames are secured to a base (not shown) which also serves to support the electric driving motor of the machine. The right and left side frames are interconnected by means of various cross-frame members including crossbars 54, 55, 56 and 57 which are shown in cross-section on Fig. 2.

The values to be entered into the accumulator numeral wheels 22 may be determined by means of a plurality of similar selecting mechanisms associated with the amount keys 29. As shown in Fig. 2, each bank of amount keys cooperates with a pair of similar value selecting slides 58 which are mounted for endwise movement by means of a suitable supporting linkage including links 59 and extending through suitable slots provided therefor in the forward crossbar 54.

Each selecting slide 58 is connected at its rear end with a ten tooth selection gear 60 slidably and nonrotatably mounted on a longitudinally extending square shaft 61 journalled in the crossbars 54, 55 and 56. Hence, the longitudinal movement of the slides 58 as differentially controlled by the numeral keys 29 serves to position the selecting gears 60 in the path of a series of stepped teeth provided on an actuating cylinder 65 secured to a shaft 66 journalled between the crossbar 54 and a transverse supporting bar 67. For each adjacent pair of key banks there is provided one longitudinally extending actuator shaft 66 bearing a pair of actuating cylinders 65. Each actuator shaft 66 is provided at its forward end with a bevel gear 68 which meshes with a corresponding bevel gear 69 secured to a transverse power shaft 70 journalled between the side frames of the machine. The shaft 70 is cyclically and uni-directionally operated by means of a clutch controlled driving means, hereinafter to be described, so as to provide a single path of power flow from the electric driving motor to the various power operated mechanisms of the machine.

Each of the square shafts 60 is provided on its rear end with a slidably but non-rotatably mounted spool 71 to which is secured a ten-tooth add gear 72 and a ten-tooth subtract gear 73, which gears are adapted to cooperate with similar ten-tooth gears 74 secured on the lower ends of accumulator numeral wheel shafts 75.

When the machine is in its idle or full cycle position, the gears 74 lie midway between the add and subtract gears 72 and 73 so as to permit lateral shifting movement of the carriage. The gears 74, in this case, are free to pass through the space existing between the gears 72 and 73.

In order to enable an amount set up on the keys 29 to be added into the accumulator wheels 22, the spools 71 and gears 72 and 73 may be shifted toward the rear of the machine so as to engage the add gears 72 with the gears 74. This shifting of the gears is accomplished by means of a flat bar or gate 76 extending transversely of the machine and lying within the space provided between the add-subtract gears 72, 73. The gate 76 is supported at either end by a pair of similar arms 77 secured to a transverse gate shaft 78 journalled between the side frames 52 and 53. The shaft 78 may be rocked clockwise as viewed in Fig. 2 in a manner hereinafter to be described so as to cause engagement of the add gears 72 with the gears 74 or alternatively, the shaft 78 may be rocked counter-clockwise so as to result in engagement of the subtract gears 73 with the gears 74.

Tens-transfer mechanism

Secured to the lower end of each of the numeral wheel shafts 75 is a tens-transfer cam 80 which is adapted to cooperate with a transfer lever 81 bearing a stud 82 which is journalled in the main frame bar 83 of the carriage. On the outer end of the transfer lever 81 there is provided a down-turned ear 84 which lies between a pair of flanges provided on the hub 85 of a tens-transfer gear 86 located in the next higher order of the machine. The hub 85 and gear 86 are slidably, but non-rotatably mounted on the square shaft 61 whereby rotation of the gear 86 will be transmitted through the add-subtract gears 72, 73 to the numeral wheel shaft 75. Whenever the accumulator wheel 22 passes from "0" to "9" or from "9" to "0", a nose on the transfer cam 80 will rock the transfer lever 81 and move the ear 84 forwardly so as to move the transfer gear 86 into the path of a single, transfer actuating tooth 87 formed on a disc 88 secured to the shaft 66. The single tooth 87 will thereby cause one step of movement to be given to the square shaft 61 in addition to the normal movement imparted thereto by the actuating cylinder 65. The accumulator wheel 22 will thus be advanced one step so as to effect the carry from one order to the next higher order as required.

After the tens-transfer has been effected, the transfer gear 86 will be restored to its normal position by means of a restoring cam 90 secured to the actuator shaft 66. This restoring cam operates on the forward end of a detent pin 91 which is mounted for sliding movement in the crossbar 67 and in a transverse supporting bar 92. The pin 91 carries a pair of spaced flanges 93 which embrace one of the flanges provided on the hub 85 of the transfer gear 86 so that when the pin is cammed rearwardly, the gear 86 will be restored to its normal position.

Revolutions counter

As shown in Fig. 2, each of the revolution counter numeral wheels 23 is secured to a longitudinally extending shaft 98 journalled at its rear end in the frame bar 83 and at its forward end in a channel bar 99 which forms a part of the framework of the carriage 21. Secured to each of the shafts 98 is a gear 100 which is arranged to cooperate with a revolutions counter actuating mechanism 101 for operating the numeral wheels 23 in such a manner as to provide a count of the cyclic operations of the calculating machine and also for causing a unit to be transferred from a lower order to a higher order each time a wheel 23 passes through zero.

The revolutions counter mechanism is fully shown and described in the above-mentioned Patent 2,229,889, to which reference may be had for a more complete disclosure of this part of the machine.

Motor drive

In order to effect registration in the accumulator of the value set up on the amount keys 29, the actuator shafts 66 are operated in a cyclic fashion by means of a clutch controlled drive from the electric motor of the machine. As shown in Fig. 3, the armature shaft 105 of the motor has secured thereto a pinion 106 which meshes with an idler gear 107 which in turn meshes with a large gear 108 journalled on the transverse power shaft 79. The gear 108 is provided with a hub to which is secured a driving clutch element or ratchet (not shown). A driven clutch element 109 is secured to the shaft 79 and has pivoted thereon a spring-urged clutch pawl 110 which is provided with a tooth which is adapted to engage with the teeth of the ratchet for establishing a driving connection between the gear 108 and the power shaft 79. The pawl 110 is normally spring-urged into drive-engaging relationship with the ratchet, but is restrained in the open or full cycle position by means of a clutch control lever 111 pivotally mounted on a screw 112 fastened to the right side frame 52. The lever 111 carries a pivoted roller 113 which seats in a depression formed on the driven clutch element 109 in the full cycle position thereof and in all other positions of the element 109 maintains the lever 111 in its clutch-engaging position. It will be seen therefore that one or more cycles of the actuator shafts 66 may be determined by proper control of the lever 111.

Simultaneous with the movement of the lever 111 in a clockwise direction, as viewed in Fig. 3, so as to cause engagement of the clutch, the electric circuit for the driving motor will be established. For this purpose a stud 114 in the upper end of the lever is connected by means of a link 115 with the upper end of a lever 116 pivotally mounted on a screw 117 secured to the right side frame. The lower end of the lever 116 is provided with a bifurcation which engages with a pin 118 provided on the upper end of a lever 119 pivotally mounted on a screw 120 secured to the right side frame 52. On its lower end the lever 119 is provided with a suitably insulated pin 121 which lies against one leaf of a leaf spring contact 122. Thus, clockwise movement of the clutch control lever 111 will cause counter-clockwise movement of the lever 119 so as to cause the pin 121 to force the contacts 122 into engagement and thereby close the electric circuit for the motor. It will be observed that the roller 113 in maintaining the control lever 111 in its clutch-engaging position throughout the machine cycle will also serve to maintain the contacts 122 closed so that the motor circuit can be interrupted only in the full cycle position of the parts.

Plus and minus keys

Referring to Fig. 5 of the drawings it will be observed that the plus key 32 and the minus key 33 are both slidably mounted on a control plate 127 mounted on the right-hand side of the right side frame 52 by means of suitable screws and spacing sleeves. The keys 32 and 33 are provided with roller studs 128 and 129, respectively, which cooperate with inclined cam faces 130 and 131, respectively, provided on a gate setting slide 132. This slide is pivotally connected at either end to the upper ends of arms 133 and 136 (Figs. 5 and 10), the arm 133 being pivoted on the control plate 127 while the arm 136 is secured to the right-hand end of the gate shaft 78. Hence, when the plus key 32 is depressed, the slide 132 will be moved rearwardly so as to rotate the gate shaft in a clockwise direction, as viewed in Fig. 2, thereby causing the add gears 72 to be engaged with the gears 74 on the numeral wheel shafts 75. In a similar manner, depression of the minus key 33 will cause forward movement of the slide 132 thereby rocking the gate shaft 78 counter-clockwise so as to engage the subtract gears 73 with the gears 74.

In order to initiate operation of the drive mechanism of the machine when either key 32 or 33 is depressed, each of these keys is provided with a half-round stud 137 which is adapted to cooperate with a cam face 138 provided on a cycle-initiating slide 139. The rear end of this slide bears against the stud 114 so that when either of the keys are depressed, the stud will be moved rearwardly thereby rocking the clutch control lever 111 (Fig. 3) clockwise so as to engage the clutch and close the contacts 122. This will cause the electric driving motor of the machine to be energized and the power shaft 70 to be rotated thereby driving the actuator shafts 66 to which are secured the actuating cylinders 65. Hence, the amount set on the keys 29 will be run into the accumulator wheels 22 in either a positive or negative direction depending on which of the keys 32 or 33 is depressed.

Carriage shift mechanism

Means are provided for shifting the carriage selectively in either direction through one or more ordinal spaces and the shifting means is preferably operated from the actuator shafts 66 under the control of the manually depressible shift keys 27 and 28. These keys are mounted for vertical sliding movement on the right side frame 52 by suitable pin and slot connections, the keys being normally maintained in their raised position by means of suitable springs.

As fully shown and described in U. S. Patent No. 2,380,642, issued to Carl M. Friden et al. on July 31, 1945, the shift keys carry studs which cooperate with a pair of arms 145 and 146 (Fig. 6) and cause the arms to be rocked when the keys are depressed. As will later be described, rocking of these arms will cause either the left shift clutch or the right shift clutch to be engaged and thereby determine shifting of the carriage in one direction or the other. As disclosed in the patent, suitable connections are also provided between the keys and the lever 116 (Fig. 3) which will cause this lever to be rocked clockwise upon depression of either of the keys 27 or 28 and thereby initiate cyclic operation of the actuator shafts 66 so as to provide the power drive for the shift mechanism.

Referring again to Fig. 6, it will be observed that the arm 145 is pinned to a transverse shaft 147 which is journalled between the right side frame 52 and a bracket 148 secured to the crossbar 54. Also pinned to the shaft 147 is an arm 149 to which is pivotally connected a pusher link 150 which is notched at its rear end so as to engage with the forward end of a left shift push rod 151 which is mounted for longitudinal sliding movement in the machine. The rear end of the link 150 is normally urged downwardly so as to engage the notch in the link with the forward end of the rod 151 by means of a spring 152.

In a like manner, the arm 146 is secured to the right-hand end of a sleeve 153 to the left-hand end of which is secured an arm 154 similar to the previously mentioned arm 149. Pivotally connected to the arm 154 is a pusher link 155 which, like the link 150, is notched at its rearward end so as to engage with the forward end of a right shift push rod 156 which is slidably mounted within the framework of the machine. The notch in the pusher link 155 is normally maintained in engagement with the forward end of the pusher link 156 by means of a spring 157. The push rods 151 and 156 are normally maintained in their forward or inactive positions as shown in Fig. 6 by means of compression springs 158 and 159, while the rear ends of the rods carry shifting forks 160 and 161 which engage with annular grooves cut in clutch members 162 and 163. The members 162, 163 are loosely journalled on the rear ends of the two right-most actuator shafts 66 and are provided with clutch teeth 164 and 165 which engage with corresponding notches provided in collars secured to the rear ends of the actuator shafts 66. The members 162 and 163 are also provided on their rear ends with clutch teeth which are adapted to cooperate with clutch teeth 166 and 167 formed on the forward ends of gear sleeves 168 and 169 when either the member 162 or the member 163 is moved rearwardly by its associated shift fork 160 or 161. Hence, it will be seen that the coupling members 162 and 163 provide a means whereby the actuator shafts 66 may be selectively coupled to the gear sleeves 168 or 169 and thereby provide a power drive for the carriage shift mechanism. Hence, upon depression of the left shift key 27 the arm 145 will be rocked and the pusher link 150 moved rearwardly so as to move the push rod 151 and the shift fork 160 toward the rear of the machine and thereby cause the coupling member 162 to establish a driving connection from the actuator shaft 66 to the gear sleeve 168. In a similar manner, when the right shift key 28 is depressed, the arm 146 will be rocked and the pusher link 155 moved rearwardly so as to operate the push rod 156 and shift fork 161 and establish a driving connection between the rightmost actuator shaft 66 and the gear sleeve 169.

As seen in Fig. 6, the gear sleeve 168 carries a gear 170 which meshes directly with a larger gear 171 to which is secured a smaller gear (not shown) which meshes with a shift gear 172. The gear sleeve 169 carries a gear 173 which meshes with a wide idler gear (not shown) which meshes with the large gear 171 and causes reverse rotation of this gear. The gear sizes are so chosen as to provide a drive ratio of 1 to 4 between the gears 170 and 173 and the shift gear 172 so that for each rotation of the gear sleeve 168 or 169, the shift gear 172 will be rotated through an angle of 90 degrees.

The shift gear 172 is secured to a shaft which is journalled between the crossbar 56 and a plate 175 mounted on the rear of the machine. Secured to the same shaft as the gear 172 is a drive plate 177 which carries four equally spaced drive pins 178 which are adapted to engage with notches 179 (Fig. 7) provided in a shift rack 180 secured on the rear of the carriage 21. Hence, for each 90 degrees of rotation of the drive plate 177 the carriage will be shifted through a distance equal to the spacing between the notches 179 which is equal to the distance between the numeral wheel shafts 75 (Fig. 2). In other words, the carriage will be shifted one ordinal space on each cycle of operation of the power shaft 70.

Means are provided for disabling the control of the shift keys 27 and 28 whenever the carriage reaches either of its extreme end positions. For this purpose means are provided for lifting the pusher links 150 and 155 against the force of the springs 152 and 157 when the carriage reaches either its left end or its right end position. The lifting of the pusher link 150 is accomplished by means of an arm 185 (Figs. 6 and 8) secured to a transverse shaft 186 which is journalled at either end in brackets 187 and 188 secured to the rear face of the crossbar 54. Fast on the right-hand end of the shaft 186 is a downwardly extending arm 189 (Fig. 9) to the lower end of which is pivotally connected the forward end of a link 190 which, as shown in Figs. 7 and 9, is pivotally connected at its rear end to one arm 191 of a bellcrank lever 192 which is journalled on the gate shaft 78. As shown in Fig. 9, this bellcrank lever has a rearwardly extending arm which lies beneath the right-hand end of a lever 193 which is pivotally mounted on a screw 194 (Fig. 7) fastened to the crossbar 56. The lever 193 corresponds to the lever 208 shown in Fig. 8 of Patent No. 2,403,273 hereinbefore referred to, and like the lever 208, is arranged to lie beneath an override pawl corresponding to pawl 206 shown in the patent. When the carriage 21 reaches its left end position, the shift pins will rock the override pawl and cause the lever 193 to be depressed against the tension of a spring 195 which normally maintains this lever in its raised position. The bellcrank lever 192 (see Fig. 9) will thereupon be rocked counter-clockwise and cause the shaft 186 to be rocked in the same direction. The forward end of the lifter arm 185 (Figs. 6 and 8) which is secured to the shaft 186 will thereby be raised so as to disengage the notch formed in the rear end of the pusher link 150 from the forward end of the push rod 151 thereby permitting this rod to be moved forwardly to its inactive position by the compression spring 158. Hence, the left shift clutch will be disengaged and the left shift operation will be terminated.

In a similar manner the pusher link 155 for the right shift control mechanism is adapted to be disengaged from the push rod 156 by means of a lifter arm 199 (Figs. 6 and 8) which is loosely journalled on the shaft 186. As shown in Fig. 9, the lifter arm 199 has integrally formed therewith a rearwardly extending arm 200 which is provided with a slot which embraces a pin 201 riveted on the forwardly extending arm of a lever 202 loosely journalled on the gate shaft 78. The lever 202 has a rearwardly extending arm which carries a roll 203 which, as shown in Fig. 7, lies above one end of a lever 204 which is pivoted at 205 on the lower end of a lever 206 pivoted at 207 on a plate 208 which is secured to the rear face of the crossbar 56 by means of suitable spacer sleeves and screws. The lever 206 has an upwardly extending arm which is provided with a formed-over ear 209 lying beneath an override pawl 210 which is pivotally mounted at 211 on the shift rack 180. This pawl is normally maintained in the position shown in Fig. 7 by means of a spring 212 which causes a shoulder formed on the pawl to be held against a stud 213 on the shift rack 180. When the carriage reaches its right end position, the shift pins 178 will engage with a cam surface 214 formed on the pawl 210 and cause the pawl to be rocked clockwise as viewed in Fig. 7 against the urgency of the spring 212. The lever 206 will thereby be rocked counter-clockwise against the urgency of a spring 215 and so cause the lever 204 to be moved toward the right as viewed in Fig. 7. The lever 204 is provided with a cam face 216 which lies beneath a roll 217 mounted on the plate 208. Hence, when the lever 204 is moved toward the right as viewed in Fig. 7, it will be rocked clockwise thereby elevating the rear end of the lever 202 so as to cause the lifter arm 199 to be raised and the pusher link 155 to be disengaged from the push rod 156. This will effectively disable the control exercised by the right shift key 28 over the right shift clutch and permit the compression spring 159 mounted on the forward end of the push rod 156 to disengage the clutch and thereby terminate the right shift operation.

The foregoing description of the carriage shift mechanism is believed sufficient for a clear understanding of the present invention and reference is made to Patent No. 2,380,642 for a more detailed disclosure of this part of the machine.

*Automatic division mechanism*

As mentioned earlier herein, the machine shown in the accompanying drawings is provided with a mechanism for enabling a dividend set up on the accumulator wheels 22 to be automatically divided by a divisor set up on the amount keys 29. The mechanism provided in the present machine for accomplishing this purpose is similar to that shown in Patent No. 2,327,981 hereinbefore referred to and accordingly, only so much of the automatic division mechanism will be described herein as is necessary for a clear understanding of the present invention.

The automatic division mechanism operates to control the functioning of the machine so as to cause the divisor to be repeatedly subtracted from the dividend until an overdraft occurs in the accumulator, whereupon the overdraft will be corrected and the carriage shifted one ordinal space to the left whereupon the process will be repeated. The number of subtraction cycles effected in each order of the accumulator is registered in the revolutions counter so as to provide a visual representation of the quotient at the end of the problem. During division the machine is controlled by a program control device which becomes effective each time an overdraft occurs in the accumulator to program the operation of the add-subtract gears and the carriage shift mechanism so as to cause a predetermined sequence of operations to occur during uninterrupted cyclic operation of the actuating mechanism of the machine. The division operation is initiated by the depression of a division key which causes the program control device to be operatively connected with the add-subtract gate and also with the carriage shift mechanism and, in addition, renders the overdraft control mechanism effective to control the cycling of the programming device.

As shown in Fig. 5, a division key 38 is slidably mounted on the control plate 127 by means of slots in the key stem which cooperate with screws secured to the control plate so as to guide the key for vertical reciprocatory movement. The key is normally urged to its raised position by means of a suitable spring 221 and is provided at its lower end with an inclined cam face 222 which bears against a roll 223 mounted on a division slide 224. This slide is supported for endwise shifting movement on the control plate 127 by means of elongated slots in the slide which cooperate with studs 225 secured to the control plate. As shown in Fig. 10, the slide 224 is provided with a roll 226 which lies in front of a finger 227 formed on the upper end of a latch 228 pivotally mounted at 229 on the control plate 127. The latch 228 is urged to rotate in a counter-clockwise direction by means of a spring 230 tensioned between the lower end of the latch and a stud 231 mounted on the control plate so as to normally maintain a shoulder 232 formed on the latch beneath a stud 233 secured to the forward end of a division setting actuator 234. The actuator 234 is pivotally mounted on the control plate at 235 and is urged to rotate in a counter-clockwise direction by means of a strong spring 236 which is tensioned between the actuator and the stud 231. The stud 233 is thereby maintained in engagement with the shoulder 232 of the latch when the parts are in their normal positions. However, when the division key 38 (Fig. 5) is depressed, the cam face 222 will engage with the roll 223 thereby moving the slide 224 rearwardly so as to cause the roll 226 to engage with the finger 227 and rock the latch 228 clockwise so as to remove the shoulder 232 from beneath the stud 233 of the actuator 234. The actuator will thereupon be rocked counter-clockwise by the strong spring 236 so as to cause setting of the division control mechanism hereinafter to be described. The actuator 234 will be restored during cycling of the machine by means of a roll 237 mounted on the face of a gear 238 secured to the right-hand end of the power shaft 70. The roll 237 is adapted to engage an inclined cam face 239 formed on an upwardly extending arm of the actuator 234 so as to cause the actuator to be rocked clockwise against the tension of the spring 236 when the machine is cycled.

Lying beneath the forward end of the actuator 234 is a roll 240 (see also Fig. 5) which is mounted on the lower end of a link 241 which is pivotally connected at 242 to the forward end of a connecting lever 243. This lever is pivotally mounted on a stud 244 carried by a cam follower arm 245 which is pivotally mounted on the control plate 127 at 246 and urged in a clockwise direction, as viewed in Fig. 5, by means of a spring 247. The arm 245 is provided with an aperture within which is located an eccentric cam 250 mounted on a program control shaft 251. As described in the aforementioned Patent No. 2,327,981, this shaft forms an essential part of the program controlling device and is rotated during division operations to control the setting of the add-subtract gate and the operation of the carriage shift mechanism. These operations are performed in a predetermined sequence so as to cause the machine to carry out a division operation during continuous cycling of the machine.

The lever 243 is provided on its rear end with a bifurcation 252 for engaging with a stud 253 secured to the gate setting slide 132. Thus, when the division key 38 is depressed so as to release the actuator 234 (Fig. 10) the roll 240 will be depressed and the connecting lever 243 will be rocked clockwise as viewed in Fig. 5 so as to cause an inclined face 254 formed on the rear end of the lever 243 to engage with the stud 253 and cam the slide 132 forward so as to engage the subtract gears 73 with the gears 74 on the shafts 75 and thereafter cause the stud 253 to become seated in the bifurcation 252. The connecting lever 243 thereby serves as a connection between the follower arm 245 and the gate setting slide 132 so that movements of the arm 245 will be communicated to the slide for the purpose of controlling the add-subtract gears during division operations.

The connecting lever 243 is retained in its operated position throughout the division operation by means of a half-round stud 260 mounted in the rear end of the lever which is adapted to be engaged by a latch 261 (see Fig. 3) pivotally mounted on a stud 259 mounted on the right side frame 52. The latch 261 is urged into latching engagement with the stud 260 by means of a tension spring 262 so that when the lever 243 is rocked counter-clockwise, as viewed in Fig. 3, the latch will engage beneath the stud 260 and hold the connecting lever in its operated position until the latch is released at the end of the division operation.

In order to initiate cycling of the machine during division operations, the link 241 (Fig. 5) is pivotally connected at its upper end to the rear end of bellcrank lever 263 which is pivotally mounted on a screw 264 secured to the control plate 127. This bellcrank is provided with an upstanding arm 265 which lies in front of a stud 266 mounted on the cycle initiating slide 139. Hence, when the link 241 is depressed upon the release of the actuator 234 (Fig. 10), the bellcrank 263 will be rocked counter-clockwise against the urgency of a spring 267 thereby causing the slide 139 to be moved toward the rear of the machine so as to engage the clutch and close the motor contact through the means previously described in connection with the plus and minus keys.

Referring to Fig. 10 of the drawings, it will be observed that the program control shaft 251 extends through the control plate 127 and is provided on its right-hand end with a mutilated gear 270 which is adapted to be moved into and out of driving relationship with a larger mutilated gear 271 which is secured to a gear 272 journalled on a screw 273 mounted in the control plate. The gear 272 in turn meshes with the gear 238 secured on the right-hand end of the power shaft 70 so that when the clutch is engaged and the shaft 70 rotated, the gear 238 will drive the gear 272 and the large mutilated gear 271. The small mutilated gear 270 is normally located out of the plane of the gear 271 so that the program control shaft 251 is normally inoperative. As shown in Fig. 8, the shaft 251 is normally urged toward the left as viewed from the front of the machine by means of a spring 275 on the shaft 251 which is compressed between a collar on the shaft and an arm 276 on a bracket 277 secured to the crossbar 67. Hence, the gear 270 is urged to a position where it lies against the right-hand side of the control plate 127 with a notch formed in the periphery of the gear engaged over a pin 278 mounted in the control plate. By means hereinafter to be described, the shaft 251 and gear 270 are shifted to the right at certain times during a division operation so as to move the gear into the plane of the large mutilated gear 271 so as to establish a driving connection to the shaft 251 from the transverse power shaft 70.

As seen in Fig. 10, the gear 270 has three equally spaced sets of three teeth each which are arranged to cooperate with a single set of three teeth provided on the gear 271. As the latter gear rotates in a counter-clockwise direction during cycling of the machine its two teeth are so positioned thereon as to engage with one of the sets of three teeth on the gear 270 just before the end of a machine cycle. Hence, when the small mutilated gear is projected into the path of the larger gear 271 during the course of a division operation, the gear 270 will be rotated clockwise through one-third of a revolution at the end of the instant cycle and also through one-third of a revolution at the end of each of the two next succeeding cycles, the gear and shaft 251 being maintained in their right-hand positions by the engagement of the pin 278 with the left-hand face of the gear 270.

Referring to Fig. 5, the lever 243 bears a stud 280 which lies beneath a forward end of an arm 281 secured to a laterally extending shaft 282 (Fig. 8) which is journalled between control plate 127 and the left side frame 53 of the machine. Also secured to the shaft 282 at the left-hand side of the machine is an arm 283 (see also Figs. 11 and 12) which is provided at its forward end with a stud 284 which engages in an elongated slot provided in the lower end of an overdraft control link 285. This link is pivoted at its upper end on a stud 286 secured to a yoke 287 which is fastened on an extension 288 of the highest order tens-transfer detent pin 91. As mentioned earlier herein, when a transfer is effected from one order of the accumulator to the next, the pin 91 will be moved forwardly as an incident to the forward movement of the transfer gear 86 for the purpose of placing this gear in the path of the transfer actuating tooth 87. Hence, when a transfer occurs which effects a forward movement of the left-most detent pin 91, the extension 288 thereof will cause the link 285 to be moved forward for a purpose to be hereinafter described.

As shown in Fig. 11, the forward end of the link 285 is normally held in its depressed or inactive position by a spring 289, but upon depression of the division key and rocking of the connecting lever 243, the shaft 282 will be rocked clockwise as viewed in Fig. 11 thereby causing the pin 284 to lift the forward end of the link 285 so that it will lie directly behind a division control flag 290 which is pivotally mounted on the control shaft 251. Hence, when the link 285 is moved forward as a result of the forward movement of the left-most detent pin 91, the flag will be rocked clockwise as viewed in Fig. 11 against the urgency of a spring 291 (see Fig. 8) so as to move an upwardly extending finger 292 on the flag into the plane of a pin 293 carried by a cylinder 294 which is mounted on the left-most actuator shaft 66. Hence, as the shaft 66 rotates, the pin 293 will engage the finger 292 and displace the flag to the right as viewed in Fig. 8. Inasmuch as the flag is prevented from moving laterally on the shaft 251 by means of a collar 295 and a cam 296 which are pinned to the shaft 251, this shaft and the small mutilated gear 270 will likewise be displaced to the right so as to bring the gear into the plane of the larger gear 271. Thus, the shaft 251 and the cam 250 (Fig. 5) will be given three steps of movement during the next three cycles of the machine, after which, the gear 270 will drop back over the pin 278 to its inactive position. In the meantime, the overdraft control link 285 will be moved rearwardly so as to release the flag 290 due to the restoration of the detent pin 91 by the restoring cam 90.

When the cam 250 (Fig. 5) occupies the position marked A, which is the position of the cam when the notch in the small mutilated gear 270 engages with the pin 278, the connecting lever 243 will be so positioned as to hold the gate setting slide 132 in its forward position so as to cause the subtract gears 73 to engage with the gears 74 on the numeral wheel shafts 75. The machine will therefore be set for subtraction and the value of the divisor set up on the amount keys 29 will be subtracted from the accumulator wheels 22 each time the machine makes one cycle of operation. At the end of the cycle in which an overdraft occurs in the accumulator, the shaft 251 will be displaced toward the right under the control of the transfer mechanism as described above thereby causing the shaft to be rotated counterclockwise to the position marked B whereupon the cam 250 will rock the follower arm 245 counter-clockwise (Fig. 5) thereby moving the connecting lever 243 toward the rear of the machine so as to cause the add gears 72 to be moved into mesh with the gears 74. Therefore, during the following cycle of operation of the machine, the divisor will be added back into the accumulator so as to correct the overdraft and at the end of this cycle the program control shaft will be rotated through another 120 degrees to the position marked C thereby moving the arm 245 to an intermediate position where the add-subtract gears 72, 73 will be held out of engagement with the gears 74 preparatory to a carriage shifting operation. The arm 245 is arranged to be yieldably maintained in this intermediate position by means of a spring-urged centralizer arm 297 provided with a V-shaped nose which is adapted to engage in a corresponding notch provided in the upper edge of the arm 245.

In order to cause the carriage to be shifted one ordinal position to the left during the machine cycle following movement of the shaft 251 to position C, a cam 298 (Figs. 8 and 9) is secured to the shaft 251, this cam being provided with a node 299. When the shaft 251 is moved toward the right by the action of the pin 293 on the flag 290, the node 299 on the cam 298 is moved toward a follower arm 300 which is secured to a hub 301 (Fig. 8) pinned to a transverse shaft 302. This shaft is journalled at its right-hand end in the right side frame 52 and at its left-hand end in the arm 276 of the bracket 277 and is arranged to receive axial shifting movements as will subsequently be explained. The hub 301 is provided with a flange 303 which, together with the follower arm 300, provides an annular groove for receiving a finger 304 provided on a bellcrank lever 305 (Fig. 9). This lever is pivotally mounted on a stud 306 mounted in a bracket 307 which is fastened to the right side frame 52. The bellcrank lever is provided with a forwardly directed arm 308 which lies over the left-hand end of the stud 280 carried by the lever 243. Hence, when the lever 243 is rocked clockwise as viewed in Fig. 5, the stud 280 will cause the arm 308 to be lifted and thereby rotate the bellcrank 305 counter-clockwise as viewed from the front of the machine so as to move the shaft 302 and the follower arm 300 to the left against the opposition of a compression spring 309 mounted on the shaft 302 at the left-hand end thereof (see Fig. 8). This left-hand movement of the follower arm 300 is sufficient to bring the arm into the plane of the node 299 when the shaft 251 occupies its active or right-hand position. The node 299 is so located on the cam 298 as to cause the follower arm 300 to be rocked counter-clockwise as viewed in Fig. 9 and held in this position when the cam 250 (Fig. 5) occupies the position marked C. Through means later to be described, this rocking movement of the arm 300 and shaft 302 will cause the left shift clutch to be engaged and thereby cause the carriage to be moved one ordinal space to the left. At the end of the shift cycle, the cam 250 will be moved from position C to position A so as to again cause the subtract gears 73 to be engaged with the gears 74 and once again cause the divisor to be subtracted from the dividend. When the cam 250 and shaft 251 reach the position marked A the notch in the small mutilated gear will again register with the pin 278 and permit the gear and the shaft to be moved toward the left under the influence of the compression spring 275 (Fig. 8) thereby terminating the operation of the program control shaft 251 until the repeated subtraction of the divisor once again causes an overdraft in the accumulator whereupon the program control mechanism will once again be set into operation so as to cause the above-described sequence of operations of the machine.

The calculating machine is provided with a counter reversing key 39 (Fig. 10) which lies immediately adjacent to the division key 38 and is normally depressed along with this key when a division operation is initiated. Depression of the key 39 causes the revolutions counter to be operated in a reverse or negative direction thereby causing the subtraction cycles, occurring during a division operation, to be counted in a positive sense. The mechanism for accomplishing this result is indicated generally at 316 and for a complete disclosure of this particular part of the machine attention is invited to U. S. Patent No. 2,294,111, granted to Carl M. F. Friden on August 25, 1942.

In division operations it is necessary that the divisor set up on the amount keys 29 be permitted to remain undisturbed throughout the division operation. As mentioned earlier herein, the present machine is provided with an add key 34 which, when depressed, will cause the amount keys to be released at the end of a cycle of machine operation. In order to prevent this action from occurring during a division operation, means is provided for disabling the operation of the key release mechanism during division operations even though the add key be depressed. For this purpose, the upwardly extending arm 265 (Fig. 5) of the bellcrank lever 263 is provided with an inclined cam face 317 which lies beneath a pin 318 (see also Fig. 3) mounted on the rear end of a lever 319 which is pivotally mounted on a stud 320 secured to the right side frame 52. At its forward end the lever 319 is provided with a stud 321 which lies above an arm 322 pivoted on a transverse shaft 323. The arm 322 in turn lies over a stud 324 which is secured to an arm 325 pivoted on a stud 326 which is secured to an arm 327 pivotally mounted on the stud 320. The arm 325 is provided at its forward end with a lip 328 which lies in front of a projection 329 formed on a clear bail 330 (see Fig. 4) pivotally mounted in the machine frame at 331. As is well-known, when the clear bail 330 is rocked counter-clockwise as viewed in Fig. 4 toward the end of the machine cycle, any depressed amount keys will thereby be released. This rocking movement of the clear bail 330 is normally caused by engagement of the lip 328 with the extension 329 of the bail. However, in division operations when the bellcrank 263 (Fig. 5) is rocked counter-clockwise the inclined cam face 317 will cam up the stud 318 thereby rocking the lever 319 counter-clockwise as viewed in Fig. 3 so as to depress the arm 322 and also the arm 325 so as to move the lip 328 into a position where it lies below the projection 329 and is incapable of operating the same.

For the purpose of operating the arm 325, the arm 327 is rocked counter-clockwise as viewed in Fig. 3 by means of a stud 332 thereon (see also Fig. 4) which is adapted to be engaged by a hook 333 formed on the forward end of a key release link 334 which is pivoted at its rear end to the upper end of a lever 335 which is pivotally mounted in the framework of the machine at 336. The lower end of the lever 335 is provided with a cam face which is adapted to be engaged by a pin 337 mounted on the right-hand side of a drum cam 338 (see also Fig. 6) mounted on the transverse power shaft 70. Hence, when the add key 34 is depressed, a stud 339 thereon will carry the forward end of the link 334 downwardly so as to engage the hook 333 with the stud 332 and at the same time permit a spring 342 to rock the cam face on the lever 335 into the path of the stud 337 so that the link 334 will be moved rearwardly toward the end of the machine cycle. The arm 327 will thereby be rocked counter-clockwise as viewed in Fig. 3 so as to move the arm 325 rearwardly and cause the key release bail 330 to be rocked and the amount keys to be released. As explained above, however, during division operations, the lip 328 will be lowered out of cooperative relationship with the extension 329 on the bail 330 thereby preventing the divisor from being cleared out of the keyboard even though the add key 34 is depressed.

The divisor will, however, be cleared from the keyboard on the last cycle of the division operation due to the fact that the connecting lever 243 (Fig. 5) will be released from the latch 261 (Fig. 3) in the early part of this last cycle thereby causing the pin 318 (Fig. 5) to be released and the arm 319 to be restored to the position shown in Fig. 3 by means of a spring 341 tensioned between the stud 324 and a stud on the side frame 52. Hence, the lip 328 will be returned to its effective position as shown in Fig. 3 and the keyboard will therefore be cleared near the end of the last cycle of a division operation.

*Division stop*

It is sometimes desirable to stop the automatic operation of the machine before the end of a division problem and for this purpose a division stop lever 350 (Fig. 3) is provided. This lever is pivotally mounted on a screw 351 secured to the right side frame 52 and is provided with a knob by means of which it may be moved forward or backward in the machine. The lever is yieldably held in either a normal position (as shown in Fig. 3) or in a forward position by means of a spring-urged detent lever 353 which engages with one or the other of a pair of notches formed in the lever 350. The lever 350 is provided on its rear end with a camming nose 354 which lies immediately above an ear 355 formed on the latch 261. Hence, when the operator moves the lever 350 rearwardly, the nose 354 will engage the ear 355 and rock the latch 261 counter-clockwise so as to cause release of the pin 260. The connecting lever 243 will thereby be permitted to drop under the influence of the spring 267 (Fig. 5) and so bring the machine to a stop at the end of the cycle during which the lever 350 was operated. However, when it is desired to terminate the division operation with a true quotient figure appearing in the counter wheels, the lever 350 is moved forwardly from the position shown in Fig. 3 so as to move the rear end of an arm 357 into engagement with the forward edge of the ear 355. The arm 357 is pivoted on the screw 351 and is urged counter-clockwise by means of a spring 358 stretched between an ear 359 formed on the lower edge of the arm 357 and an ear formed on the upper edge of the lever 350. Counter-clockwise movement of the arm 357 is normally limited by engagement of the ear 359 with the lower edge of the lever 350 as illustrated in Fig. 3. Hence, when the lever 350 is rocked counter-clockwise the rear end of the arm 357 will engage with the underside of the ear 355 on the latch 261 and upon further movement of the lever 350 will cause stretching of the spring 358. The spring-urged detent 353 will maintain the lever 350 in its forward position until just prior to stoppage of the machine at which time the lever will be restored to its normal position, as shown in Fig. 3, by a restoring lever 343 pivoted on a stud 344 secured to the right side frame 52. This lever is provided with a formed-over ear 345 which lies in the path of a restoring cam 346 secured to the program control shaft 251. The positioning of the parts is such that the cam will engage the ear and rock the lever during the last 120 degrees of movement of the shaft 251, i. e., as the shaft moves from C to A (Fig. 5). The lever 343 is provided with a forwardly extending arm 347 which lies over an ear 348 formed on the rear end of the stop lever 350. Hence, when the lever 343 is rocked by the cam 346 at the end of the shift cycle, the arm 347 will contact the ear 348 and restore the stop lever to its normal position.

When the connecting lever 243 is moved rearwardly at the end of the cycle in which an overdraft occurs, the latch 261 will be rotated counter-clockwise due to the rearward travel of the stud 260 whereupon a shoulder 369 on the arm 357 will be moved up in front of the ear 355 due to the action of the spring 358. Hence, when the connecting lever 243 is moved forwardly at the end of the add-back cycle preparatory to the shifting of the carriage in the next cycle, the stud 260 will be pulled off of the latch 261 and the lever 243 permitted to drop so as to cause the division operation to be terminated at the end of the shift cycle.

Inasmuch as it is ordinarily desirable to permit the setting of the divisor to remain on the keyboard at the conclusion of a division operation which has been terminated by means of the division stop lever 350, means is provided for preventing the release of the amount keys when this lever is manipulated. As shown in Fig. 4, the lever 350 carries a pin 365 which passes through an aperture provided in the side frame 52 and is received within a curved slot provided in the rear end of a lever 366 pivotally mounted on a stud 367 fastened to the side frame 52. On its forward end the lever 366 is provided with a bent-over ear 368 which lies beneath a shoulder 369 formed on an arm 370 which is freely pivoted on the stud 336. The forward end of the arm 370 is provided with a finger 371 which overlies the rear end of a lever 372 pivoted on a screw 373 fastened to the side frame 52. The lever 372 is provided at its forward end with a stud 374 which lies beneath the rear end of the lever 319 as shown in Fig. 3. The shape of the curved slot provided in the lever 366 is such that this lever will be rocked counter-clockwise as viewed in Fig. 4 on movement of the lever 350 in either direction from its normal position. Hence, whenever this lever is manipulated to stop a division operation, the arm 370 will be rocked clockwise and thereby cause counter-clockwise movement of the lever 372. Hence, the stud 374 will lift the rear end of the lever 319 (Fig. 3) and thereby cause the lip 328 to be moved downwardly to a position where it will pass beneath the extension 329 on the clear bail when the arm 327 is rocked near the end of the machine cycle. Hence, the amount keys will not be released at the end of the cycle in which the connecting lever 243 is released and the divisor will remain set on the keyboard ready for a continuation of the division operation if such should be desirable.

Since the stop lever 350 is not arranged to be held in its rearward position by means of the spring-urged detent lever 353 means must be provided for holding the arm 370 (Fig. 4) in its rocked position after the lever 350 has been moved toward the rear and then released. This is accomplished by means of a latch lever 375 which is pivoted on the stud 367 and is provided with a latching shoulder 376 which is urged by a spring 378 toward engagement with an ear 377 on the arm 370. When the arm 370 is rocked, the shoulder 376 will move behind the ear 377 and the arm will thus be held in its clockwise position so as to prevent the release of the amount keys. At the end of the machine cycle the rear end of the key release link 334 will engage with an ear 379 formed on the latch lever 375 and disengage the same from the arm 370 so as to permit the arm to be restored to the position shown in Fig. 4 under the influence of the spring 378.

Inasmuch as the stop lever 350 will be held in its forward or true quotient position by means of the spring-urged detent 353, the operation of the latch lever 375 is unnecessary in order to insure that the keys will not be released at the end of the cycle of operation and accordingly, the latch lever 375 is arranged to be disabled when the lever is pulled forwardly. This is accomplished by means of a finger 380 formed on the rear end of the lever 375 which is adapted to be engaged by the pin 365 when the lever 350 is moved forwardly so as to rock the lever 375 counter-clockwise thereby rendering it ineffective.

In case the division operation is permitted to proceed to its final conclusion, the machine will be stopped by means of a pawl 349 (Fig. 3) located on the right-hand end of the carriage which will move behind a finger 365 on the latch 261 when the connecting lever 243 moves rearwardly for the add-back cycle and thus cause the pin 260 to be pulled off of the latch when the lever 243 moves forwardly for the shift cycle of the division operation. This mechanism is conventional and is fully shown and described in afore-mentioned Patent No. 2,327,981.

Automatic division aligner

Division operations are normally performed on the present machine by setting up the dividend on the keys 29 and then depressing the dividend tab key 51. The carriage will thereupon shift to its left-end position where the accumulator and revolutions counter will be reset to zero after which the carriage will be shifted toward the right until it reaches the position selected by a depressed tab key 50. The carriage will then come to rest and the dividend will be entered automatically into the accumulator wheels 22, after which operation the machine will come to rest. Following the entry of the dividend as above described, the divisor will be set up on the amount keys and the division key 38 depressed so as to initiate an automatic division operation. The mechanism employed in the present machine for automatically aligning the dividend and divisor preparatory to a division operation will be rendered operative by depression of the division key 38 so as to properly align the factors prior to the division operation per se. The dividend can, of course, be entered into the accumulator wheels 22 in other ways rather than through the use of the dividend tab key 51. For example, the wheels 22 may be positioned manually in accordance with the value of the dividend factor by means of the twirler knobs 386 or the dividend figure may be the result of the multiplication of two numbers, which product is to be divided by a third number. In any case, once the dividend has been entered into the accumulator, it is only necessary for the operator to set up the divisor on the keyboard and depress the division key whereupon the hereinafter to be described aligning mechanism will cause shifting of the carriage until the two factors of the problem are brought into proper alignment after which a conventional automatic division operation will automatically commence. In machines incorporating the present invention it is no longer necessary for the operator to determine by inspection whether the factors are in proper alignment and, if misaligned, to bring them into alignment by operating the shift keys 27 or 28 before depressing the division key.

Referring now to Fig. 8 of the drawings, it will be recalled that upon depression of the division key the shaft 302 is shifted axially to the left against the force of the spring 309 and also that the shaft 302 is rocked clockwise as viewed from the right-hand side of the machine on each shift cycle of the automatic division operation. Secured to the shaft 302 is a male driving element 390 which is provided with teeth engaging with a driven element 391 which is secured to the left-hand end of a sleeve 392 loosely journalled on the shaft 302. The sleeve 392 is urged toward the right by means of a compression spring 393 but is restrained against such movement by means of a pair of latches 394, 395 (see also Fig. 14) which are pivotally mounted on a screw 396 (Fig. 8) which is fastened to a formed-over ear provided on an arm 397 secured to the clutch element 390. The latches 394, 395 are provided with latching shoulders 398 which are urged into engagement with an abutment face 399 (Fig. 14) provided on a left shift arm 400 by means of appropriate springs 401 and 402 tensioned between the latches and an extension formed on the arm 397. As shown in Fig. 8, the left shift arm 400 is secured to the left-hand end of the sleeve 392 while a right shift arm 403, similar to the arm 400, is secured to the right-hand end of the sleeve 392. As shown in Figs. 8 and 14, the rear ends of the arm 400 and 403 are provided with pressure faces which are adapted to engage with corresponding faces provided on ears 404 and 405 formed on the shifting forks 160 and 161, respectively. When the machine is at rest, the arm 400 is in alignment with the ear 404 while the arm 403 lies to the right of the ear 405 and is, therefore, in an inoperative position with respect to the shifting fork 161 which controls the right shift clutch of the machine. However, when the division key is depressed and the shaft 302 shifted toward the left, the arm 403 will be brought into alignment with the ear 405 so as to be in a position to control engagement of the right shift clutch while the arm 400 is moved out of alignment with the ear 404 so as to prevent operation of the left shift clutch. Hence, when the program control mechanism is rendered active so as to control the add-shift-subtract sequence of operations of the machine, the right shift clutch will be engaged upon rocking of the shaft 302 at the beginning of the shift cycle and cause the carriage 21 to be shifted one ordinal space to the right. At the conclusion of the shift cycle, the node 299 (Fig. 9) on the cam 298 will move from beneath the follower arm 300 and a spring 388 (Fig. 14) attached to the bottom of the left shift arm 400 will restore the shift arms and the shaft 302 to their normal positions where an abutment face 389 formed on the shifter arms will lie against the rear face of the supporting bar 92.

In order to cause repeated cycling of the program control shaft 251 during the automatic aligning operation a slide 406 is mounted for lateral sliding movement on the bracket 277. As shown in Fig. 8, the arm 276 of the bracket is provided with a formed-over ear 407 which carries a screw 408 (Fig. 7) which engages with an elongated slot provided in the slide 406. The bracket 277 is also provided with an arm 409 (Fig. 8) having a bent-over ear 410 which carries a screw 411 (Fig. 7) which is received in a second slot provided in the slide 406 whereby the slide is guided for transverse shifting movements within the machine. On its right-hand end the slide is notched as shown in 412, which notch engages with the edge of the left shift arm 400 (see also Fig. 14). On its left-hand end the slide 406 is provided with an inclined camming face 413 which overlies a tail 414 provided on the flag 290. Hence, when the sleeve 392 is shifted to the left along with the shaft 302 at the beginning of a division operation, the slide 406 will likewise be shifted to the left and the tail 414 will be cammed downwardly so as to rock the finger 292 on the flag into alignment with the pin 293 (Fig. 11) so as to cause the control shaft 251 to be shifted toward the right and thereby rendered operative. Inasmuch as the flag 290 is held in its rocked or active position by the slide 406, the program control shaft 251 will be repeatedly cycled and thereby cause a one step shifting movement of the carriage to the right for every three cycles of the machine. This shifting of the carriage to the right will be continued until both of the latches 394 and 395 have been tripped by mechanism hereinafter to be described so as to release the sleeve 392 to the action of its spring 393 whereupon the left-hand shifter arm will move into alignment with the ear 404 on the shift fork 160 so as to cause the left shift clutch to be engaged each time the shaft 302 is rocked. At the same time, the slide 406 will be moved toward the right so as to release the tail 414 of the flag and thereby permit the flag to be once again placed under the control of the overdraft control link 285. Hence, once the latches 394 and 395 have been operated so as to release the sleeve 392, the program control mechanism will function in its normal manner to bring about an automatic division operation and cause the dividend to be divided by the divisor in the conventional way.

As shown in Figs. 8, 11 and 12, the shaft 282 has secured thereto an arm 415 which bears a stud 416 underlying an arm 417 which is pivoted on a stud 418 secured to the left side frame 53. The arm 417 has integrally formed thereon a downwardly extending arm 419 provided with a bent-over ear 420. Also freely pivoted on the stud 418 is a lever having a downwardly extending arm 421 on which is formed an ear 422 which is yieldably connected with the ear 420 by means of a spring 423. The upper end of this lever is provided with a bifurcation 424 and also with a rearwardly extending finger 425 which lies beneath the cam 296 mounted on the left-hand end of the control shaft 251. Hence, when the shaft 282 is rocked clockwise as viewed in Fig. 11 at the beginning of a division operation, the arm 417 will be elevated by the stud 416 so as to move the ear 420 away from the rear edge of the arm 421 thereby tensioning the spring 423 and urging the finger 425 into engagement with the underside of the cam 296 as shown in Fig. 12. The cam 296 is provided with a flat face 426 which lies parallel with the upper edge of the finger 425 when the shaft 251 is rotated to its carriage shift position. Hence, at the beginning of a carriage shift cycle the spring 423 will rock the arm 421 counter-clockwise as viewed in Fig. 11 so as to move a pin 427 mounted on the lower end of a lever 428 toward the front of the machine.

The lever 428 is pivotally mounted on a stud 429 secured to the left side frame 53 and at its upper end is provided with a sensing finger 430 (see also Fig. 13) which is adapted to cooperate with sensing slides 431 which are mounted for longitudinal sliding movement in the carriage 21. As better shown in Fig. 13, each slide is provided at its forward end with an enlarged head 432 which is guided for sliding movement in a suitable slot provided in the channel bar 99 extending across the front of the carriage. At its rear end each slide is provided with an elongated slot 434 which engages with a screw 435 fastened in the framework of the carriage and thereby serves to guide the rear end of the slide 431. The slides 431 are provided with a series of laterally extending arms 436 which are arranged in overlapping relationship whereby whenever any slide 431 is held in its forward position it will also hold forward all slides to the right of it. Each slide 431 is provided at its rear end with a V-shaped nose 437 which is adapted to cooperate with a zero cam 438 provided on each of the numeral wheel shafts 75. Each of the cams 438 is provided with a zero notch 439 so that whenever any of the numeral wheels are located in their zero positions the notch 439 therein will lie in line with the nose 437 on its related sensing slide 431. In any other position of the numeral wheel, however, the nose 437 will lie adjacent to an unbroken portion of the periphery of the cam 438 and thereby be blocked from rearward movement. Hence, when the lower end of the lever 428 is urged forwardly by the spring 423, as previously described, the upper end of the lever will be urged rearwardly so as to cause the sensing finger 430 to press against the forward end of the sensing slide 431 aligned therewith. If the wheel being sensed, or any of the wheels to the left of the wheel being sensed, contains a figure other than zero, the sensing finger will be unable to push its related slide 431 rearwardly and will thereby be blocked against rearward movement. However, when the slide being sensed by the finger 430 lies opposite a notch 439 and all of the higher order slides likewise lie opposite notches 439, the sensing finger will be moved rearwardly by the spring 423 during the shift cycle thereby allowing the lower end of the arm 421 (Figs. 11 and 12) to move toward the rear of the machine.

Pivotally connected to the bottom of the arm 421 is a link 450 which at its opposite end is pivotally connected to an arm 451 formed on a bail 452 (see also Figs. 7, 8 and 14) which is freely pivoted on the shaft 282. This bail is provided at its right-hand end with a finger 453 (Figs. 8 and 14) the upper end of which lies behind the left-hand end of the latch 395. Hence, when the link 450 is moved rearwardly by the arm 421, the bail 452 will be rocked counter-clockwise, as viewed in Fig. 14, thereby rocking the latch 395 counter-clockwise as viewed in Fig. 8 so as to release the shifter arm assembly from restraint by the latch 395. The latch 395 is somewhat shorter than the latch 394, that is, the distance between the latching face 398 and the pivot screw 396 is slightly smaller in the case of this latch than in the case of the upper latch 394. Consequently, when the latch 395 is removed, the spring 393 will cause the sleeve 392 and shift arms 400 and 403 secured thereto to escape slightly to the right, as viewed in Fig. 8, until it contacts the latching face 398 of the longer latch 394. Consequently, once the sensing mechanism for the numeral wheels 22 has sensed zeros in the order being sensed by the finger 430 and all higher orders, the shifter arms and sleeve 392 will be permitted to escape slightly to the right so as to thereafter be under the control of the longer latch 394 alone.

The latch 394 is adapted to be released under the control of the highest order transfer pin 91. For this purpose the overdraft control link 285 (Figs. 11 and 12) carries a stud 454 which lies above an arm 455 formed on the left-hand end of a bail 456 which, like the bail 452, is pivoted on the shaft 282. The arm 455 is provided with a nose 457 which is adapted to be engaged by the pin 454 when the link 285 is moved forwardly in response to a tens-transfer affecting the highest order transfer pin 91. The arm 455 will thereby be rocked counter-clockwise as viewed in Figs. 11 and 14. At its right-hand end the bail 456 is provided with a finger 460 which lies behind a small angle bracket 461 secured to the left-hand end of the long latch 394. The bracket 461 prevents the upper end of the finger 460 from becoming disengaged from the latch during clockwise rocking movements of the shaft 302. When a transfer occurs which affects the highest order pin 91, the finger 460 will be moved forward so as to rock the long latch 394 counter-clockwise as viewed in Fig. 8 thereby releasing the sleeve 392 and the shift arms 400 and 403 to the influence of the spring 393 which will thereupon shift the assembly to the right so as to bring the arm 400 into line with the ear 404 on the left shift fork 160. This will effectively reverse the direction of carriage shift under the control of the program control mechanism and at the same time will cause the slide 406 to release the tail 414 on the flag 290 so as to enable the flag to be controlled by the overdraft control link 285 as in a normal division operation. The division operation will continue in a normal manner until stopped by manipulation of the stop lever 350 or until the carriage reaches its extreme left-hand position where the pawl 349 on the carriage will cause the latch 261 to be disabled. In either event, upon termination of the division operation the connecting lever 243 will be permitted to drop thereby releasing the bellcrank 365 (Fig. 9) and permitting the shaft 392 to be restored toward the right by means of the compression spring 309 (Fig. 8). Inasmuch as the slide 406 was previously moved toward the right by the spring 393, and since further movement of the slide in this direction is prevented by the screws 408 and 411 (Fig. 7) engaging with the ends of the slots in the slide, the sleeve 392 will be prevented from partaking of any further movement toward the right so that the spring 309 which is stronger than the spring 393 will compress the latter spring and cause the latches 394 and 395 to once again become engaged with the latching face 399 (Fig. 14) preparatory to another division operation.

In connection with the mechanism just described, it will be noted that the latches 394 and 395 must be released in a predetermined sequence in order to permit shifting of the sleeve 392 so as to change the setting of the shift mechanism from right shift to left shift. In other words, the long latch 394 may be repeatedly released by the finger 460 with no effect unless the short latch 395 has been previously released. In this case, the long latch will be moved back into latching position by its spring 401 when the finger 460 moves away from the latch upon restoration of the transfer pin 91. However, after the carriage has been shifted to a position where only zeros are sensed by the finger 430, the short latch 395 will be released at the beginning of the shift cycle and the shifter arm assembly will escape slightly to the right until caught by the long latch 394. The short latch cannot thereafter re-engage with the latching face 399 (Fig. 14) and will remain disabled for the rest of the operation. Consequently, when the highest order transfer pin 91 moves forward as the result of an overdraft in the accumulator, the long latch 394 will be released and the shift arm assembly will be permitted to complete its right-shift shifting movement so as to condition the machine for division.

As shown in Fig. 13, the sensing finger 430 senses the accumulator wheel located in the 11th order of the machine. Since the wheel in the 11th order and all higher order wheels must stand at zero in order to enable the short latch 395 to be disabled at the beginning of the shift cycle, and since the highest order transfer pin 91 lies between the 11th and 12th orders of the machine, the effectual release of the sleeve 392 by the long latch 394 can only occur as the result of a true overdraft in the accumulator, i. e., an operation in which the wheels 22 in the 11th and all higher orders move from 0 to 9.

In order to insure that the sensing finger (Fig. 13) is permitted to move rearwardly and thereby trip the short latch 395 when the carriage is in its extreme right-hand position, the sensing slide 431 associated with the leftmost numeral wheel 22 is provided with a shortened head 465. Hence, when the carriage has been shifted all the way to the right, the sensing finger will be moved to the rear by the spring 423 during the shift cycle regardless of whether or not a significant digit appears in the leftmost numeral wheel 22. The leftmost slide 431 is provided with a laterally extending arm 466 which overlies the arm 436 on the adjacent slide 431 so that unless a zero stands in the highest order wheel 22 all of the lower order slides 431 will be held in their forward positions.

It will also be noted in Fig. 13 that a fixed, or dummy head 467 is secured to the rail 433 at the right end of the series of sensing slides 431. When the carriage is in its extreme left-hand position, the head 467 will lie immediately behind the sensing finger 430 and so prevent the short latch from being disabled when the carriage is in this position.

Means must also be provided for causing the long latch 394 to always be released when the carriage has reached its extreme right-hand position regardless of whether an overdraft has occurred in the accumulator or not. Otherwise, under certain conditions, an overdraft might not result during a subtraction cycle of the machine during the factor alignment phase of the division operation and, since a subtraction cycle is followed by an add-back cycle, an overdraft could never occur with the carriage in this position. Consequently, the long latch 394 would never be released and the machine would continue to cycle indefinitely with the carriage in its rightmost position. In order to prevent this contingency from ever occurring, means is provided for tripping the long latch during a carriage shifting operation with the carriage in its extreme right-hand position. As shown in Fig. 14, the bail 456 is provided with an upstanding finger 470 which lies in front of a finger 471 provided on a lever 472 pivoted at 473 on an extension 474 of the plate 208. The lever 472 is also provided with a rearwardly extending arm 475 which carries a roll 476 which lies beneath the left-hand end of the lever 204 (Fig. 7). Consequently, when the lever 204 is shifted toward the left as a result of an operation of the override pawl 210, the left-hand end of the lever 204 will be forced downwardly due to the cooperation of the roll 217 with the inclined cam face 216 and thereby cause the lever 472 to be rocked clockwise as viewed in Fig. 14. The finger 471 will thereby act on the tail 470 to rock the finger 460 forwardly and cause the long latch 394 to be released.

Since this release of the long latch by the lever 472 occurs during a shift cycle in which the right shift arm 403 is engaged with the ear 405 of the right shift fork 461 (Fig. 8) and since the frictional engagement of the rear end of the arm 403 with the ear 405 creates sufficient drag to prevent spring 393 from shifting the sleeve 392 and the shift arms to the right against the force of this drag, it is necessary to provide means for maintaining the long latch disabled until after the end of the shift cycle when the shift arm 403 has been restored so as to eliminate the aforementioned drag. The shift arm assembly will then be free to escape to the right under the influence of the spring 393.

This is accomplished in the present instance by means of a latch 480 (Fig. 14) which is pivotally mounted on a stud 481 which is secured to a bracket 482 mounted on the rearward face of the bail 452. The latch 480 is connected by a spring 483 with the arm 471 of the lever 472 so as to normally maintain a finger 484 provided on the latch 480 in engagement with the upper edge of the bail 452. When the bail 452 is rocked counter-clockwise during the shift cycle due to the shortened head 465 (Fig. 13) lying behind the sensing finger 430, a latching nose 485 provided on the latch 480 will be brought into engagement with the underside of a square stud 486 mounted on the lower end of an arm 487 formed integrally with the lever 472. Consequently, when the lever 472 is rocked clockwise during the shift cycle, the square stud 486 will be moved forward thereby permitting the nose 485 to move up behind the stud 486 under the influence of the spring 483 which was tensioned during the rocking movement of the bail 452. Consequently, when the lever 204 (Fig. 7) is returned toward the right upon restoration of the override pawl 210 prior to the end of the shift cycle, the lever 472 will be held in its rocked position by means of the latch 480 and the long latch 394 will be held disabled. This condition will be maintained until the end of the shift cycle when the flat-sided cam 296 on the control shaft 251 will be rotated to the position shown in Fig. 12. This will cause the bail 452 to be positively restored to the position shown in Fig. 14 thereby releasing the stud 486 from the nose 485 and permitting the lever 472 to be returned to the position shown in Fig. 14 under the influence of the spring 483. However, by the time this occurs the shift arm assembly will have been released by the shift cam 298 (Fig. 9) and moved to the right by the spring 393 so as to condition the machine for left-hand shifting of the carriage during the remainder of the division operation.

When the machine is brought to a stop at the end of a division operation by the pawl 349 (Fig. 3) moving behind the latch 261 as described earlier herein, the latch will remain thus disabled until the carriage is shifted to the right so as to remove the pawl from behind the latch. Hence, if the operator were to attempt to initiate another division operation with the latch thus disabled, the connecting lever 243 would not be held in its rocked position and the machine would come to a stop at the end of the first cycle. In order to overcome this difficulty, the present machine is provided with a second or auxiliary latch 361 (Fig. 3) which is pivotally mounted on the stud 259 immediately beside the latch 261. The latch 361 is shorter than the latch 261, i. e., the latching face formed thereon is somewhat closer to the pivot stud 259 than it is in the case of the latch 261. The auxiliary latch carries a stud 362 which is held against an abutment face provided on the restoring lever 343 by a spring 363 stretched between the stud 362 and a stud 364 mounted in the right side frame. Hence, when the connecting lever 243 is rocked following depression of the division key, the latch 361 will be effective to engage with the stud 260 and retain the lever in its rocked position even though the regular latch 261 is held disabled by pawl 349. The machine will thus be able to proceed with the factor aligning phase of the division operation in the normal manner.

Means is provided for disabling the auxiliary latch at the end of the first shift cycle after the carriage has moved one step to the right and the latch 261 has been released by the pawl 349 and moved into latching position beneath the stud 260. This is accomplished by a cam face 381 provided on the restoring lever 343 which lies beneath a stud 382 on the latch 361 and rocks the latch counter-clockwise when the lever 343 is rocked by the cam 346. The auxiliary latch will thus be disengaged and the stud 260 will drop down into the latching face of the long latch 261 where it will remain until this latch is disabled at the end of the division operation. After the cam 346 has moved beyond the ear 345, the spring 363 will return the latch 261 to its normal position and the stud 382 acting on the cam face 381 will return the restoring lever 343 to the position shown in Fig. 3 where a face 383 formed thereon lies against the stud 364.

*Operation*

When a dividend standing on the accumulator wheels 22 is to be divided by a divisor set on the numeral keys 29, the operator merely depresses the division key 38 after which the machine will operate automatically to bring the highest significant figures of the dividend and divisor into alignment and then proceed to carry out a normal automatic division operation (assuming that the factors have been set into the machine in the proper manner). Upon depression of the division key, the shaft 302 (Fig. 8) will be shifted to the left and, inasmuch as the latches 394, 395 are engaged with the shift arm assembly at this time, the sleeve 392 will likewise be shifted to the left so as to condition the machine for a right shift operation each time the shaft 302 is rocked. At the same time, the slide 406 will be shifted to the left so as to depress the tail 414 of the flag 289 thereby rendering the program control mechanism effective to produce the sequence of add, shift, and subtract cycles of the machine. The carriage 21 will continue shifting toward the right until the sensing finger 430 moves rearwardly so as to indicate that there are no more significant figures in the dividend lying to the left of the finger 430 whereupon the short latch 395 will be disabled and permit the shift arm assembly to escape slightly to the right until caught by the long latch 394. This will occur at the beginning of the shift cycle of the machine due to the control exercised by the flat-sided cam 296 over the numeral wheel sensing mechanism. As soon thereafter as an overdraft occurs in the accumulator, the long latch 394 will be disabled and the shift arm assembly will be released so as to condition the machine for left-hand shifting of the carriage under the control of the program control mechanism. This mechanism will now be controlled by the overdraft control link 285 in the normal manner inasmuch as the tail 414 of the flag has now been released by the slide 406. A normal division operation will now take place with left-hand shifting of the carriage until the operation is terminated by manipulation of the division stop lever 350 or by the pawl 349 located on the right-hand end of the carriage.

If an overdraft of the accumulator does not occur before the carriage reaches its extreme right-hand position, an overdraft will be simulated at this time by the lever 472 (Fig. 14) and the shifter arm assembly will thereby be released from the long latch so as to set the machine for a normal dividing operation.

We claim:

1. A calculating machine adapted to perform division operations comprising a frame, a carriage mounted for endwise shifting movement on said frame, a register comprising a series of ordinally arranged numeral wheels mounted on said carriage, said wheels being settable to represent the various digits of a dividend, a value indexing means mounted in said frame, an amount entering means mounted on said frame for entering a value set in the indexing means into said register, drive means including a right shift drive and a left shift drive for shifting said carriage in either direction across said frame, manually controlled means for initiating a division operation, division program means operable in response to operation of said initiating means and operative to control operation of said amount entering means and said drive means so as to cause a predetermined sequence of operation including subtraction of the divisor from said register to an overdraft and intermittent operation of said left shift drive to shift said carriage to the left in each ordinal series of operations, means cooperating with said intiating means for temporarily disabling said left shift drive and enabling the right drive and for operating said right shift drive in a predetermined cyclic sequence, means for latching said last-mentioned means in operative position, and latch releasing means operated by shift of said carriage to a predetermined right-hand position for unlatching said latch and thereby enabling said division control means to control shifting of said carriage to the left.

2. In a calculating machine adapted to perform division operations by the successive subtraction method, the combination of a frame; a carriage mounted for endwise shifting movement on said frame; a register comprising a series of ordinally arranged numeral wheels mounted on said carriage, said wheels being settable to represent the various digits of a dividend; a plural order selection mechanism for receiving a divisor factor; a transmission mechanism settable to either an add or a subtract position for enabling a divisor received in said selection mechanism to be entered either additively or subtractively into said register; a settable drive means for shifting said carriage in either direction with respect to the various orders of said selection mechanism; a program control mechanism for controlling the setting of said transmission mechanism and the operation of said drive means according to a prearranged program including a shift of said carriage in one direction to bring the lower order numeral wheels into alignment with said selection mechanism; means for initiating operation of said program control mechanism, means for conditioning said program control mechanism for setting said drive means so as to cause shifting of said carriage in the opposite direction when operation of said program control mechanism is initiated; means for sensing a zero setting of said numeral wheels in all orders higher than the highest order of said selection mechanism, means for sensing an overdraft in a predetermined order of said register, and mechanism including means responsive to the sensing of zero in all such higher orders of said register wheels and means responsive to the sensing of an overdraft for conditioning said program control mechanism to reverse the setting of said drive means so as to cause shifting of said carriage in the said one direction under the control of said program control mechanism.

3. In a calculating machine of the class described having a shiftable carriage, a dividend register in said carriage, said register including a series of numeral wheels in which a dividend factor may be registered, means including a keyboard and a differential actuating mechanism for entering a divisor factor into said register, and reversible means for shifting said carriage in either direction, the combination of a manually controlled means for initiating a division operation; means controlled by said initiating means for causing said shifting means to initiate a shift of said carriage to the right whereby the factors may be brought into proper alignment for the commencement of a division operation; and means including a device for sensing the zero positions of the register wheels in all orders higher than the highest order of said keyboard and a device for sensing an overdraft in a predetermined order of said register for reversing the shifting means, whereby the factors are first brought into proper alignment and thereafter the carriage to be shifted in the opposite direction during the remainder of the division operation.

4. In a calculating machine of the class described having a transversely shiftable carriage, a dividend register in said carriage, said register having inboard orders and outboard orders, means including a keyboard and a differential actuating mechanism for entering a divisor into the inboard orders of said register, and means for shifting said carriage either to the right or to the left, the combination of division control means for operating said differential actuating mechanism and said carriage shifting means to divide an amount registered in said dividend register by an amount set in said keyboard, ordinal sensing means for determining whether or not the outboard orders of said register contain other than a zero registration; means for sensing an overdraft in the inboard orders of said register; aligning means rendered effective upon the initiation of a division operation for causing said carriage shifting means to shift said carriage to the right; means controlled by said ordinal sensing means and said overdraft sensing means for disabling said aligning means and enabling said division control means when all of the outboard orders of the register are set at zero and an overdraft has occurred in said register; and means operating in response to movement of said carriage into its extreme right-hand position for causing said shifting means to shift said carriage to the left irrespective of the control exercised by said ordinal sensing means and said overdraft sensing means.

5. In a calculating machine of the class described having a shiftable carriage, a dividend register in said carriage having inboard orders and outboard orders, means including a keyboard and a differential actuating mechanism for entering a divisor in the inboard orders of said register, a tens-carry mechanism for transferring a unit from a lower inboard order of said register to a higher inboard order thereof, and means including a right shift drive and a left shift drive for shifting said carriage in either direction, the combination of division control means for operating said differential actuating mechanism and said left shift drive to divide an amount registered in said dividend register by an amount set up on said keyboard, means for detecting a transfer by said tens-carry mechanism from the next-to-highest inboard order to the highest inboard order of said register operative to control operation of said division control means; a division initiating member; aligning means operated with said member for operating said right shift drive cyclically; a series of ordinally arranged members mounted on said carriage for cooperation with said outboard orders; a sensing lever cooperating with said members for detecting the presence of a number other than zero in said outboard orders; and means jointly operated by said detecting means and said sensing lever for terminating the operation of said aligning means and then to release the division control means to control by said detecting means.

6. In a machine of the class described having means for giving the machine cycles of operation, a shiftable carriage, a series of ordinally arranged register wheels in said carriage on which a dividend may be registered including a plurality of inboard order wheels and a plurality of outboard order wheels, means including a keyboard and a differential actuating mechanism for entering a divisor into said inboard register wheels, a tens-transfer mechanism for the inboard order wheels for transferring a unit from a lower order wheel to a higher order wheel each time a wheel passes through zero, means controlled by said tens-transfer mechanism for detecting an overdraft in said inboard order wheels, and means for shifting said carriage including a right shift clutch and a left shift clutch, the combination of a program control mechanism for causing said machine to perform a division operation through add-back, shift, and subtract cycles during continuous and uninterrupted cycling of the machine; means operable by said overdraft detecting means for controlling the operation of said program control mechanism during the division operation; means operable by said program control mechanism for engaging one or the other of said shift clutches, said means being positionable in either a right shift clutch engaging position or in a left shift clutch engaging position; manually controlled means for moving said engaging means to its right shift clutch engaging position and for rendering said program control mechanism operative during sufficient machine cycles to effect shifting of the carriage to the right to a position of alignment of the dividend with the divisor; means for sensing the zero or non-zero setting of said register wheels in all orders higher than the highest order of said keyboard; and means controlled jointly by said sensing means and said overdraft detecting means for causing said engaging means to be moved to its left shift clutch engaging position after the dividend and divisor have been brought into alignment.

7. In a machine of the class described having means for giving the machine cycles of operation, a shiftable carriage, a series or ordinally arranged register wheels in said carriage on which a dividend may be registered including a plurality of inboard order wheels and a plurality of outboard order wheels, means including a keyboard and a differential actuating mechanism for entering a divisor into said inboard register wheels, a tens-transfer mechanism for the inboard order wheels for transferring a unit from a lower order wheel to a higher order wheel each time a wheel passes through zero, means controlled by said tens-transfer mechanism for detecting an overdraft in said inboard order wheels, and means for shifting said carriage including a right shift clutch and a left shift clutch, the combination of a program control mechanism for causing said machine to perform a division operation through add-back, shift, and subtract cycles during continuous and uninterrupted cycling of the machine; means operable by said overdraft detecting means for controlling the operation of said program control mechanism during the division operation; means operable by said program control mechanism for engaging one or the other of said shift clutches, said means being positionable in either a right shift clutch engaging position or in a left shift clutch engaging position; manually controlled means for moving said engaging means to its right shift clutch engaging position and for rendering said program control mechanism operative during sufficient machine cycles to effect shifting of the carriage to the right to a position of alignment of the dividend with the divisor; means for sensing the zero or non-zero setting of said register wheels in all orders higher than the highest order of said keyboard; means for resiliently urging said engaging means to move from its right shift clutch engaging position to its left shift clutch engaging position; means for restraining said engaging means against movement by said urging means; and means controlled jointly by said sensing means and said overdraft detecting means for disabling said restraining means whereby shifting of the carriage to the right will be terminated and shifting of the carriage to the left commenced when all of said higher order wheels are set at zero and said overdraft detecting means has been operated in response to an overdraft in said register wheels.

8. In a machine of the class described having means for giving the machine cycles of operation, a shiftable carriage, a series of ordinally arranged register wheels in said carriage on which a dividend may be registered including a plurality of inboard order wheels and a plurality of outboard order wheels, means including a keyboard and a differential actuating mechanism for entering a divisor into said inboard register wheels, a tens-transfer mechanism for the inboard order wheels for transferring a unit from a lower order wheel to a higher order wheel each time a wheel passes through zero, means controlled by said tens-transfer mechanism for detecting an overdraft in said inboard order wheels, and means for shifting said carriage including a right shift clutch and a left shift clutch, the combination of a program control mechanism for causing said machine to perform a division operation through add-back, shift, and subtract cycles during continuous and uninterrupted cycling of the machine; means operable by said overdraft detecting means for controlling the operation of said program control mechanism during the division operation; means operable by said program control mechanism for engaging one or the other of said shift clutches, said means being positionable in either a right shift clutch engaging position or in a left shift clutch engaging position; manually controlled means for moving said engaging means to its right shift clutch engaging position and for rendering said program control mechanism operative during sufficient machine cycles to effect shifting of the carriage to the right to a position of alignment of the dividend with the divisor; means for sensing the zero or non-zero setting of said register wheels in all orders higher than the highest order of said keyboard; means for resiliently urging said engaging means to move from its right shift clutch engaging position to its left shift clutch engaging position; and means for restraining said engaging means against movement by said urging means, said means including a pair of latches arranged to be disabled by said sensing means and said overdraft detecting means, whereby shifting of the carriage to the right will be terminated and shifting to the left commenced when all of said higher order wheels are set at zero and said overdraft detecting means has been operated in response to an overdraft in said register wheels.

9. In a machine of the class described having means for giving the machine cycles of operation, a shiftable carriage, a series of ordinally arranged register wheels in said carriage on which a dividend may be registered including a plurality of inboard order wheels and a plurality of outboard order wheels, means including a keyboard and a differential actuating mechanism for entering a divisor into said inboard register wheels, a tens-transfer mechanism for the inboard order wheels for transferring a unit from a lower order wheel to a higher order wheel each time a wheel passes through zero, means controlled by said tens-transfer mechanism for detecting an overdraft in said inboard order wheels, and means for shifting said carriage including a right shift clutch and a left shift clutch, the combination of a program control mechanism for causing said machine to perform a division operation through add-back, shift, and subtract cycles during continuous and uninterrupted cycling of the machine; means operable by said overdraft detecting means for controlling the operation of said program control mechanism during the division operation; means operable by said program control mechanism for engaging one or the other of said shift clutches, said means being positionable in either a right shift clutch engaging position or in a left shift clutch engaging position; manually controlled means for moving said engaging means to its right shift clutch engaging position and for rendering said program control mechanism operative during sufficient machine cycles to effect shifting of the carriage to the right to a position of alignment of the dividend with the divisor; means for sensing the zero or non-zero setting of said register wheels in all orders higher than the highest order of said keyboard; means for resiliently urging said engaging means to move from its right shift clutch engaging position to its left shift clutch engaging position; and means for restraining said engaging means against movement by said urging means, said means including a short latch arranged to be disabled by said sensing means and a long latch arranged to be disabled by said overdraft detecting means whereby shifting of the carriage to the right will be terminated and shifting to the left commenced after said sensing means has signified the zero setting of all of the higher order wheels and said overdraft detecting means is then operated in response to an overdraft in said register wheels.

10. In a machine of the class described having means for giving the machine cycles of operation, a shiftable carriage, a series of ordinally arranged register wheels in said carriage on which a dividend may be registered including a plurality of inboard order wheels and a plurality of outboard order wheels, means, including a keyboard and a differential actuating mechanism for entering a divisor into said inboard register wheels, a tens-transfer mechanism for the inboard order wheels for transferring a unit from a lower order wheel to a higher order wheel each time a wheel passes through zero, and means controlled by said tens-transfer mechanism for detecting an overdraft in said inboard order wheels, the combination of a program control mechanism for automatically causing said machine to operate through a sequence of add, shift and subtract cycles; means controlled by said overdraft detecting means for initiating operation of said program control mechanism; means controlled by said program control mechanism for causing shifting of said carriage, said means including a device movable to one position to cause shifting of the carriage in the direction of the lower order wheels and to another position to cause shifting of the carriage in the direction of the higher order wheels; means connected with said device for initiating operation of said program control mechanism when said device is moved to said one position; means for sensing the zero or non-zero setting of said register wheels in all orders higher than the highest order of said keyboard; manually controlled means for moving said device to said one position, and for enabling said sensing means; means operable by said program control mechanism for disabling said sensing means except during shift cycles of the machine; means for resiliently urging said device to move from said one position to said other position; and means for restraining said device against movement by said urging means, said restraining means including a short latch arranged to be disabled by said sensing means and a long latch arranged to be disabled by said overdraft detecting means whereby shifting of the carriage in the direction of the lower order wheels will be terminated and shifting in the opposite direction commenced with normal functioning of said program control mechanism under the control of said overdraft detecting means when said sensing means has signified the zero condition of all higher order wheels during a shift cycle and said overdraft detecting means has then been operated during a subsequent subtraction cycle in response to an overdraft in the inboard order wheels.

11. In a calculating machine of the class described having means for giving the machine cycles of operation, a carriage shiftable either to the right or to the left, a register mounted on said carriage in which a dividend may be registered, and means including a keyboard and a differential actuating mechanism for entering a divisor into said register, the combination of a program control mechanism for automatically causing said machine to perform a division operation through a sequence of add, shift and subtract cycles; means responsive to an overdraft in said register for controlling said program control mechanism during the division operation; means controlled by said program control mechanism for causing shifting of said carriage, said means including a device movable to one position to cause shifting of said carriage to the right and to another position to cause shifting of the carriage to the left; means controlled by said device for initiating operation of said program control mechanism when said device is moved to said one position and for maintaining said program control mechanism operative during shifting of said carriage to the right; manually controlled means for moving said device to said one position and for initiating operation of said cycling means; and mechanism including means operating in response to the movement of said carriage into its extreme right-hand position for causing said device to be moved to said other position thereby terminating the operation of said program control mechanism under the control of said device and conditioning the machine for left-hand shifting of the carriage.

12. In a calculating machine of the class described having means for giving the machine cycles of operation, a shiftable carriage, means for shifting said carriage either to the right or to the left, a register in said carriage for receiving a dividend factor, and means, including a keyboard and a differential actuating mechanism, for entering a divisor into said register, the combination of a program control mechanism for automatically causing said machine to perform a division operation through a sequence of add, shift and subtract cycles; means responsive to an overdraft in said register for controlling said program control mechanism during the division operation; means controlled by said program control mechanism for operating said shifting means, said means including a device movable to one position to cause shifting of said carriage to the right and to another position to cause shifting of the carriage to the left; means controlled by said device for initiating operation of said program control mechanism when said device is moved to said one position and for maintaining said program control mechanism operative during shifting of said carriage to the right; manually controlled means for moving said device to said one position and for initiating operation of said cycling means; and mechanism including means operated by said shifting means in a predetermined position of said carriage for causing said device to be moved to said other position whereby the operation of said program control mechanism under the control of said device will be terminated and the machine will be conditioned for left-hand shifting of the carriage.

13. In a machine of the class described having means for giving the machine cycles of operation, a shiftable carriage, a series of ordinally arranged register wheels in said carriage on which a dividend may be registered including a plurality of inboard order wheels and a plurality of outboard order wheels, means, including a keyboard and a differential actuating mechanism, for entering a divisor into said inboard register wheels, a tens-transfer mechanism for the inboard order wheels for transferring a unit from a lower order wheel to a higher order wheel each time a wheel passes through zero, means controlled by said tens-transfer mechanism for detecting an overdraft in said inboard order wheels, and means for shifting siad carriage including a right shift clutch and a left shift clutch, the combination of a program control mechanism for causing said machine to perform a division operation through add-back, shift, and subtract cycles during continuous and uninterrupted cycling of the machine; means operable by said overdraft detecting means for controlling the operation of said program control mechanism during the division operation; means operable by said program control mechanism for engaging one or the other of said shift clutches, said means being positionable in either a right shift clutch engaging position or in a left shift clutch engaging position; manually controlled means for moving said engaging means to its right shift clutch engaging position and for rendering said program control mechanism operative during sufficient machine cycles to effect shifting of the carriage to the right to a position of alignment of the dividend with the divisor; means for sensing the zero or non-zero setting of said register wheels in all orders higher than the highest order of said keyboard; means controlled jointly by said sensing means and said overdraft detecting means for causing said engaging means to be moved to its left shift clutch engaging position after the dividend and divisor have been brought into alignment; and mechanism including means operating in response to movement of said carriage into its extreme right hand position for causing said engaging means to be moved to its left shift clutch engaging position thereby conditioning the machine for left-hand shifting of the carriage.

14. In a calculating machine capable of solving problems in division comprising a selection means on which the various digits of a divisor may be set, a carriage mounted for ordinal shifting movement in either direction on said machine, a carriage shifting mechanism including a right shift clutch, a left shift clutch, and a clutch operating means including a common member movable to a right shift position to control operation of said right shift clutch and to a left shift position to control operation of said left shift clutch, a register in said carriage containing a plurality of register dials settable to represent the various digits of a dividend, a division control mechanism including means yieldably biasing said common member to its left shift position and means responsive to an overdraft in a preselected order for causing operation of said clutch operating means, a manipulatable member for effecting operation of said division control mechanism, means operated simultaneously with said member for moving said common member to said right shift position to cause engagement of said right shift clutch, latch means for latching said common member in its said right shift position, means operative while said member is in its said right shift position for causing cyclic operation of said clutch operating means, and latch releasing means operated by shift of said carriage to a predetermined right-hand position for unlatching said latch.

15. In a calculating machine capable of solving problems in division comprising a selection means on which the various digits of a divisor may be set, a carriage mounted for ordinal shifting movement in either direction on said machine, a carriage shifting mechanism including a right shift clutch, a left shift clutch, and a common member operable to cause engagement of one or the other of said clutches and having a right shift position in which it operates the said right shift clutch and a left shift position in which it operates the said left shift clutch, a register in said carriage containing a plurality of register dials settable to represent the various digits of a dividend, differential actuating means for transmitting a value determined by said selection means into said register; a division control mechanism for programming operation of said actuating means and said shifting means, including means for yieldably biasing said common member to said left shift position and means responsive to an overdraft in a preselected order for causing operation of said common member, a division initiating key, means operated simultaneously with said division key for positively positioning said common member in its right shift position and for cyclically causing operation of said common member, means for latching said common member in right shift position, and latch releasing means operated by shift of said carriage to a predetermined right-hand position for unlatching said latch means.

16. In a calculating machine capable of solving problems in division comprising a selection means on which the various digits of a divisor may be set, a carriage mounted for ordinal shifting movement in either direction on said machine, a carriage shifting mechanism for shifting said carriage in either direction including a right shift clutch, a left shift clutch, a clutch control means selectively operable to enable either of said clutches for operation, and clutch operating means for operating the one of said clutches determined by said clutch control means, a register containing a plurality of register dials settable to represent the various digits of a dividend, a division key, a division control mechanism including means normally biasing said clutch control means to enable said left shift clutch and means responsive to an overdraft in a preselected order for operating said clutch operating means, aligning means operated with said division key for positioning said clutch control means to enable said right shift clutch for operation, latching means for holding said clutch control means in said last-mentioned position, means operative while said latching means is operative to cyclically operate said clutch operating means, and latch releasing means operated by shift of said carriage to a predetermined right-hand position for unlatching said latching means.

17. In a calculating machine capable of solving problems in division comprising a selection means on which the various digits of a divisor may be set, a carriage mounted for ordinal shifting movement in either direction on said machine, a carriage shifting mechanism for shifting said carriage in either direction, a register containing a plurality of register dials settable to represent the various digits of a dividend, a division key, a division control mechanism including means responsive to an over-draft in a preselected order for operating said shifting means, a shift control means for controlling the direction of operation of said shifting mechanism, positioning means resiliently urging said shift control means to a position to enable a carriage shift to the left, a control means operable with said division key for positioning said shift control means in a position to cause a carriage shift to the right, latch means for holding said shift control means in said last-mentioned position, means for cyclically operating said shifting means while said shift control means is in said last-mentioned position, and latch releasing means operated by shift of said carriage to the extreme right-hand position for unlatching said latch means.

18. A calculating machine for solving problems in division comprising a cyclically operable drive means, means for receiving the dividend factor, means for receiving the divisor factor, a differential actuating means for transferring the value in the divisor factor receiving means into the dividend factor receiving means additively or subtractively, means for ordinaly shifting one of said factor receiving means relative to the other, a division control mechanism for operating said actuating means and said shifting means to cause the divisor factor to be subtracted from the dividend factor and the shiftable factor receiving means to be shifted during continuous, uninterrupted cycling of the machine, a member for initiating operation of said division control mechanism, means cooperating with said member for conditioning said division control mechanism to cause it to effect operation of said shifting means to shift said shiftable factor receiving means in a predetermined sequence in the direction to bring the highest orders of the dividend factor receiving means into alignment with the highest order of the divisor factor receiving means in order to bring said factors into proper alignment for the commencement of a division operation, means for sensing a zero value in the dividend factor receiving means in orders higher than those of the divisor receiving means, and means controlled by said sensing means for disabling said conditioning means after the factors have been brought into alignment and for causing the machine to commence an automatic division operation during continuous, uninterrupted cycling of the machine.

19. A calculating machine capable of carrying out problems in division comprising a carriage mounted for endwise shifting movement on said machine, a register mounted on said carriage, said register including a plurality of ordinally arranged numeral wheels capable of being set to represent the various digits of a dividend, an ordinally arranged amount entering means for entering a divisor into said register, means for shifting said carriage in either direction across said machine, a programming mechanism operated to control said amount entering means and said carriage shifting means so as to cause a predetermined sequence of operations including cyclic shifting of the register in the direction to bring higher orders of the register into alignment with the amount entering means and another and variable sequence of operations including subtraction of the divisor from said register and intermittent shifting of the carriage in the direction to bring the lower orders of the register into alignment with the amount entering means, manually controlled means operative to initiate operation of said program mechanism in the first-mentioned sequence of operations, mechanism including means for sensing the zero or non-zero setting of said numeral wheels in all orders higher than the highest order of said amount entering means, and means responsive to the sensing of a zero setting in all said higher orders for terminating the first-mentioned sequence of operations and for changing operation of said programming mechanism to the second-mentioned sequence of operations.

20. In a calculating machine of the class described having a shiftable carriage, a dividend register in said carriage comprising a series of ordinally arranged numeral wheels on which the dividend factor may be set, means including a keyboard and a differential actuating means for entering a divisor factor into said register, and means for shifting said carriage, the combination of program means for controlling the division of an amount registered in said dividend register by an amount set in said keyboard, including means for causing said shifting means to shift said carriage intermittently to the left as required by the division operation; manually operated means for initiating operation of said program means; aligning means cooperative with said manually operated means for reversing the control of said shifting means by said program means to cause shifting of said carriage to the right and for causing cyclic operation of said shifting means to shift said carriage to the right until the factors are brought into alignment; a device for sensing the setting of numeral wheels of higher order than the highest order of said keyboard as to their deviation from a zero value; and mechanism operative in response to a predetermined sensing by said sensing device for terminating operation of said aligning means and to enable normal operation of said program means, thereby causing said shifting means to shift said carriage to the left after the dividend and divisor have been brought into alignment.

21. In a calculating machine of the class described having a transversely shiftable carriage, a dividend register in said carriage, said register having inboard orders and outboard orders, means including a keyboard and a differential actuating mechanism for entering a divisor into the inboard orders of said register, and means for shifting said carriage, said means being settable to cause either right-hand shifting of the carriage or left-hand shifting thereof, the combination of program means for controlling the operation of said differential actuating mechanism and said carriage shifting means to divide an amount registered in said dividend register by an amount set up on said keyboard; an ordinal sensing means for sensing the presence of zero or non-zero registrations in the outboard orders of said register; means for sensing an overdraft in the inboard orders of said register; manually operated means for initiating a division operation; and aligning means also controlled by said manually operated means for modifying operation of said program means to cause cyclic operation of said shifting means and to set said carriage shifting means for right-hand shifting of said carriage; and means controlled by said ordinal sensing means and said overdraft sensing means for releasing said aligning means when all of the outboard orders of said register contain a zero registration and an overdraft has occurred in said register, thereby enabling said program means to control a division operation.

22. In a calculating machine of the class described having a shiftable carriage, a dividend register in said carriage having a plurality of inboard orders and a plurality of outboard orders, means including a keyboard and a differential actuating mechanism for entering a divisor into the inboard orders of said register, and means for shifting said carriage, the combination of means for sensing an overdraft in the inboard orders of said register; program means operated by said overdraft sensing means for operating said differential actuating mechanism and said carriage shifting means to shift said carriage to the left in irregular cycles to divide an amount registered in said dividend register by an amount set up on said keyboard, including a reversing mechanism for said shifting means; aligning means operative to position said reversing mechanism for shifting said carriage to the right and to modify operation of said program means to cause regular cyclic operation of said shifting means; a plurality of ordinally arranged means for detecting the presence of a number other than zero in any of the outboard orders of said register; a sensing member cooperating with said ordinally arranged means; and means controlled by said sensing member and said overdraft sensing means for positioning said reversing mechanism for shifting said carriage to the left and to disable said sensing member so as to cause said carriage to be shifted to the left under control of said means for sensing an overdraft after the factor registered in said dividend register is brought into alignment with the factor set up on said keyboard.

23. In a calculating machine of the class described having a shiftable carriage, a dividend register in said carriage having inboard orders and outboard orders, means including a keyboard and a differential actuating mechanism for entering a divisor in the inboard orders of said register, a tens-carry mechanism for transferring a unit from one inboard order of the register to the next higher inboard order thereof, means for detecting the transfer of a unit by said tens-carry mechanism from the next to highest inboard order to the highest inboard order of said register, and means for shifting the carriage either to the left or to the right, the combination of program means under the control of said detecting means for controlling the actuating mechanism and the shifting means to divide an amount registered in said dividend register by an amount set up on said keyboard, through the steps of repeated subtraction to an overdraft, an additive corrective cycle and shifting of the carriage to the left; means for sensing the character of the registrations in the outboard orders of said register; and aligning means cooperating with said detecting means and said sensing means for so controlling the operation of said shifting means as to cause said carriage to be shifted to the right and to modify the operation of the program means to operate the machine in the steps of subtract, add-back and shift in continuous sequence, whereby the dividend and divisor are properly aligned for the commencement of a division operation.

24. In a machine of the class described having an amount entering means in which the various digits of a divisor may be set, a shiftable carriage, a register mounted in said carriage in which the various digits of a dividend may be registered, means for transmitting the divisor value from said amount entering means into said register, and means including a right shift drive and a left shift drive for shifting said carriage in either direction relative to said amount entering means, the combination of sequence operation control means conditionable for automatically dividing the dividend by the divisor including means for detecting an overdraft and means operated thereby for controlling said transmitting means and said shifting means during continuous, uninterrupted operation of the machine; means for conditioning said sequence operation control means for division operation including a shift control member normally positioned to operate said left shift drive and operated during a division operation by said detecting means to operate said shifting means to intermittently effect a carriage shift to the left; means including a manipulative element associated with said means for conditioning said sequence operation control means for moving said shift control member from its normal position to a position to operate said right shift drive and for initiating operation of said shift member in regular cycles of operation, a latch for retaining said member in its right shift position, and means on said carriage for causing said latch to be disabled and the division operation to be initiated when said carriage reaches a predetermined ordinal position.

25. In a machine of the class described having a cyclically operable drive means, an amount entering means in which the various digits of a divisor may be set, a carriage shiftable from one ordinal position to another, an ordinal register mounted in said carriage in which the various digits of a dividend may be registered, a tens-transfer mechanism associated with each order of said register, actuator means for causing the divisor value either to be added into or subtracted from said register, and means for shifting said carriage relative to said amount entering means, the combination of means for automatically causing the dividend to be divided by the divisor, including a program control mechanism for causing said machine to operate through a sequence of add-back, shift and subtract cycles; means for controlling the direction of the carriage shift during a division operation including a member movable from a normal left shift position to a right shift position; means including a manipulative element for initiating operation of said program control mechanism and for moving said member from its left shift position to its right shift position; a long latch for retaining said member in its right shift position; means operated by a predetermined ordinal transfer mechanism for causing said long latch to be disabled; a short latch for retaining said member in its right shift position; means for sensing a zero value in all orders of said register to the left of said actuator means; means operated by said zero sensing means for releasing said short latch; and means operatively connected to said member and operative when said member is in its right shift position to cause cyclic operation of said member.

26. In a calculating machine capable of solving problems in division comprising a selection means on which the various digits of a divisor may be set, a differential actuating means, a carriage mounted for ordinal shifting movement in either direction on said machine, a carriage shifting mechanism including a right shift clutch, a left shift clutch, and a clutch operating means for causing operation of said clutches, a register in said carriage containing a plurality of register dials settable to represent the various digits of a dividend, a division control mechanism including means for resiliently conditioning said clutch operating means for operation of said left shift clutch, a division key, means operated simultaneously with said division key for positively conditioning said clutch operating means for operation of said right shift clutch and for cyclically causing operation of said clutch operating means, means for retaining said clutch operating means in its right shift position, and releasing means operated by shift of said carriage to a predetermined right-hand position for releasing said retaining means.

27. In a calculating machine of the class described having a frame, a shiftable carriage mounted on said frame, a dividend register having inboard and outboard orders in said carriage, means including a keyboard and a differential actuating mechanism mounted in said frame for entering a divisor factor into the inboard orders of said register, and means for shifting said carriage in either direction across the machine, the combination of division programming means for controlling the division of a dividend factor registered in said dividend register by a divisor factor set up on said keyboard including means for causing said shifting means to shift said carriage to the left, a division key for initiating operation of said division programming means, sensing means mounted on said frame for sensing a zero or nonzero setting in all of said outboard orders of said dividend register, aligning means initially operated with said division key to cause said carriage shifting means to shift said carriage to the right; and means controlled by said sensing means operative when sensing a zero condition in all of said outboard orders to terminate said shift of the carriage to the right and to initiate operation of said division programming means so as to enable the machine to proceed with the division of the dividend factor by the divisor factor.

ANTHONY B. MACHADO.
FRANK J. PRUELLAGE.

References Cited in the file of this patent
UNITED STATES PATENTS

| Number | Name | Date |
|---|---|---|
| 2,327,981 | Friden | Aug. 31, 1943 |
| 2,365,507 | Allen | Dec. 19, 1944 |
| 2,408,097 | Pott | Sept. 24, 1946 |